United States Patent
Hatta et al.

(10) Patent No.: US 9,660,305 B2
(45) Date of Patent: May 23, 2017

(54) METHOD OF CONTROLLING STORAGE BATTERY, APPARATUS FOR CONTROLLING STORAGE BATTERY, AND ELECTRIC POWER CONTROL SYSTEM

(71) Applicant: NGK INSULATORS, LTD., Nagoya (JP)

(72) Inventors: Tetsuya Hatta, Kuwana (JP); Akihiro Kai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 230 days.

(21) Appl. No.: 14/180,698

(22) Filed: Feb. 14, 2014

(65) Prior Publication Data
US 2014/0162091 A1 Jun. 12, 2014

Related U.S. Application Data

(63) Continuation of application No. PCT/JP2012/070716, filed on Aug. 8, 2012.
(Continued)

(51) Int. Cl.
*H01M 10/633* (2014.01)
*H01M 10/39* (2006.01)
(Continued)

(52) U.S. Cl.
CPC ... *H01M 10/5022* (2013.01); *H01M 10/3909* (2013.01); *H01M 10/443* (2013.01);
(Continued)

(58) Field of Classification Search
CPC .......... H01M 10/633; H01M 10/3909; H01M 10/443; H01M 10/46; H01M 10/465; H02J 3/32
See application file for complete search history.

(56) References Cited

U.S. PATENT DOCUMENTS 5,345,162 A * 9/1994 Shiojima ............... H02J 7/0081
320/164
7,947,403 B2 5/2011 Maenaka
(Continued)

FOREIGN PATENT DOCUMENTS

EP 1 143 595 A2 10/2001
JP 06-251804 A 9/1994
(Continued)

OTHER PUBLICATIONS

International Search Report and Written Opinion dated Dec. 6, 2012.
(Continued)

*Primary Examiner* — Ula C Ruddock
*Assistant Examiner* — Thomas Parsons
(74) *Attorney, Agent, or Firm* — Burr & Brown, PLLC

(57) ABSTRACT

A method of controlling a high-temperature storage battery connected to an electric power system, an apparatus for controlling the storage battery, and an electric power control system reside in that, when the temperature of the storage battery is equal to or lower than a reference temperature, charging and discharging the storage battery with charging and discharging electric power, which is the sum of charging and discharging electric power based on a preset process of operating the storage battery and charging and discharging electric power corresponding to charging and discharging cycles each of a continuous charging time of 1 hour or shorter and a continuous discharging time of 1 hour or shorter, for thereby supplying thermal energy to the storage battery.

14 Claims, 26 Drawing Sheets

Related U.S. Application Data

(60) Provisional application No. 61/525,218, filed on Aug. 19, 2011.

(51) Int. Cl.
  *H01M 10/44* (2006.01)
  *H01M 10/46* (2006.01)
  *H02J 3/32* (2006.01)
  *H02J 9/06* (2006.01)
  *H01M 10/6571* (2014.01)

(52) U.S. Cl.
  CPC ......... *H01M 10/46* (2013.01); *H01M 10/465* (2013.01); *H01M 10/633* (2015.04); *H02J 3/32* (2013.01); *H02J 9/062* (2013.01); *H01M 10/6571* (2015.04); *H01M 2220/00* (2013.01)

(56) References Cited

U.S. PATENT DOCUMENTS

| | | |
|---|---|---|
| 8,571,735 B2 | 10/2013 | Koga et al. |
| 2001/0043013 A1 | 11/2001 | Abe |
| 2007/0054188 A1 | 3/2007 | Miller et al. |
| 2008/0224541 A1 | 9/2008 | Fukuhara |
| 2012/0176091 A1 | 7/2012 | Abe et al. |

FOREIGN PATENT DOCUMENTS

| | | | |
|---|---|---|---|
| JP | 06251804 | * | 9/1994 |
| JP | 2000-182662 A1 | | 6/2000 |
| JP | 2001-275273 A | | 10/2001 |
| JP | 2001-327083 A | | 11/2001 |
| JP | 2003-317808 A1 | | 11/2003 |
| JP | 2004-047208 A1 | | 2/2004 |
| JP | 2004-111123 A1 | | 4/2004 |
| JP | 2008-049877 A | | 3/2008 |
| JP | 2008-236821 A | | 10/2008 |
| JP | 2009-078807 A | | 4/2009 |
| JP | 2010-127271 A | | 6/2010 |
| JP | 2011141969 | * | 7/2011 |
| WO | 2008/023245 A2 | | 2/2008 |
| WO | WO 2008/047944 | | 4/2008 |
| WO | 2010/079794 A1 | | 7/2010 |
| WO | 2011/043173 A1 | | 4/2011 |

OTHER PUBLICATIONS

Chinese Office Action (With English Translation), Chinese Application No. 2012800403124, dated Aug. 20, 2015 (8 pages).
Japanese Office Action (With English Translation), Japanese Application No. 2014-508207, dated Jul. 5, 2016 (9 pages).
Japanese Office Action (With Partial English Translation), Japanese Application No. 2014-508207, dated Mar. 7, 2017 (5 pages).

* cited by examiner

FIG. 5
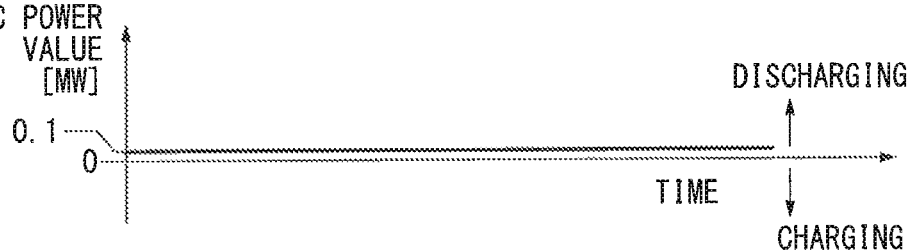
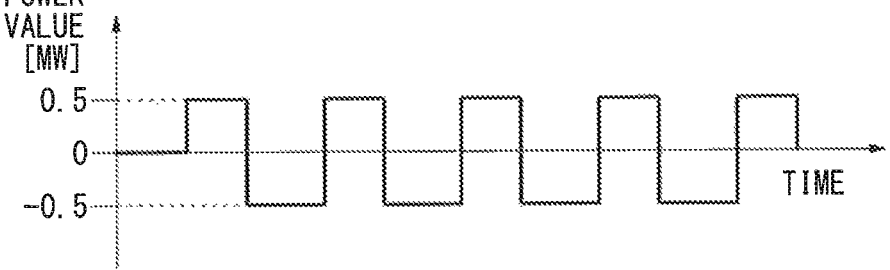
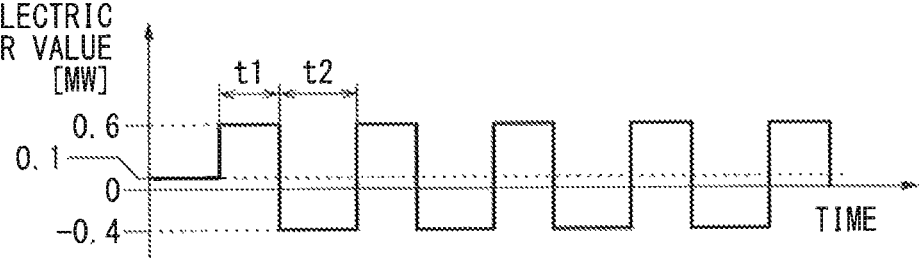

FIG. 13
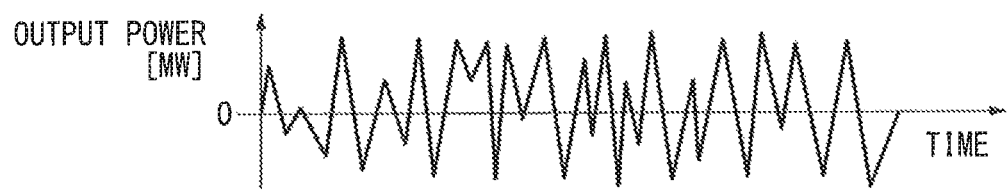
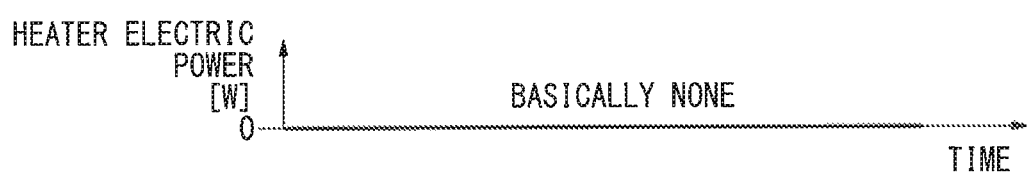
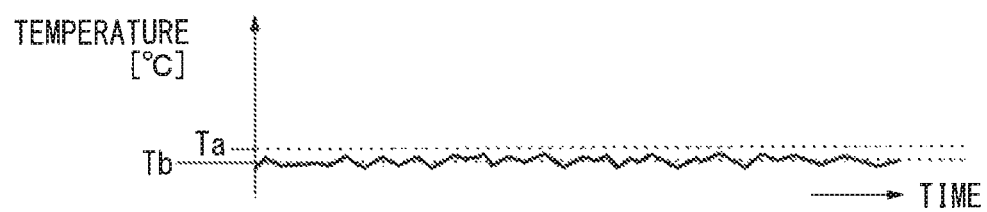
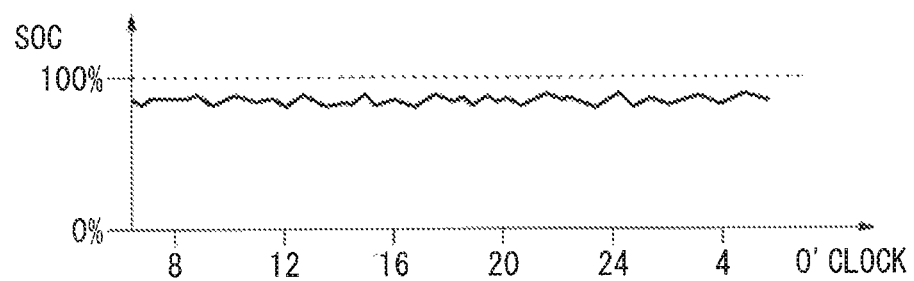

FIG. 18
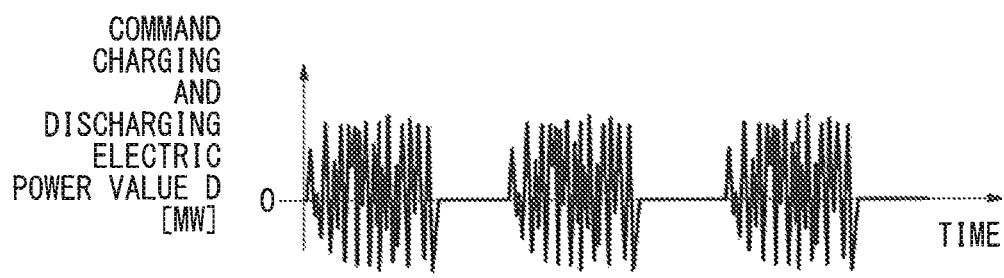
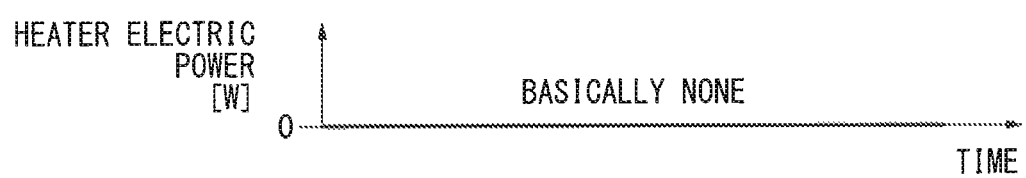
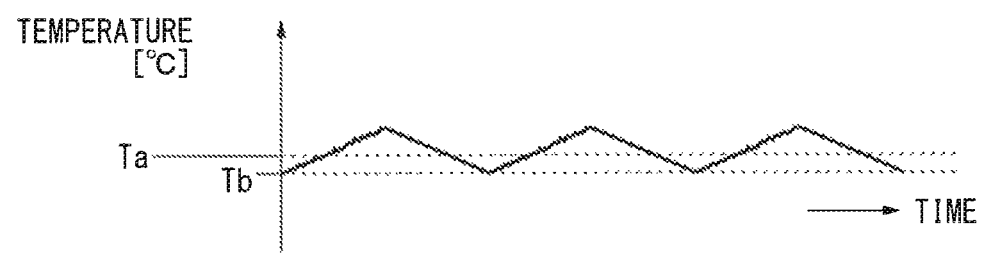
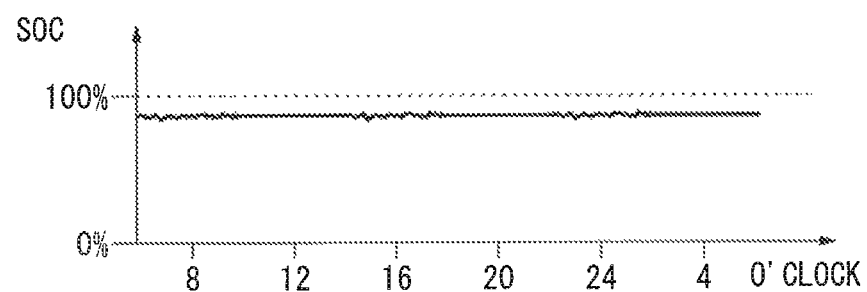

FIG. 25    PRIOR ART
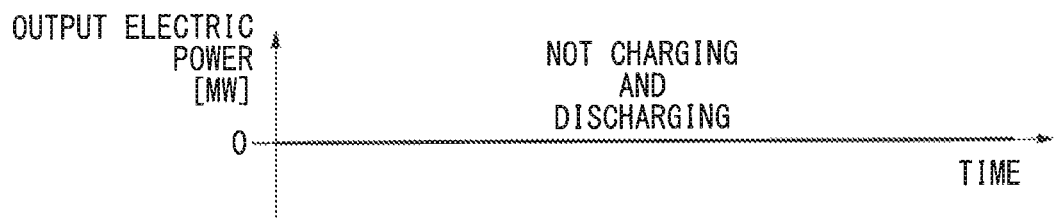
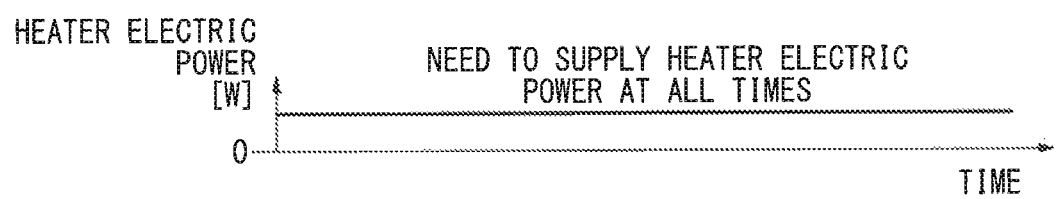
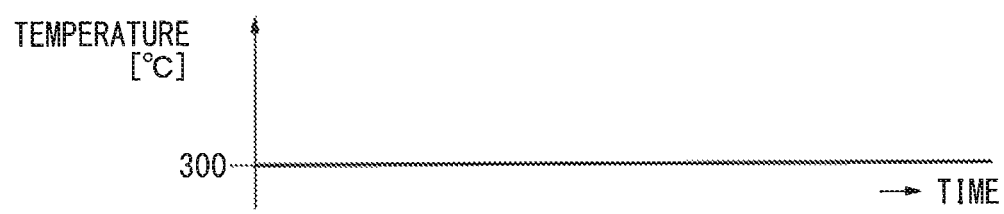
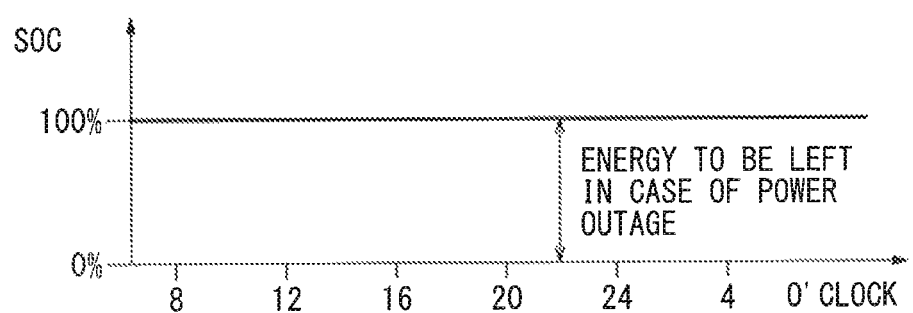

METHOD OF CONTROLLING STORAGE BATTERY, APPARATUS FOR CONTROLLING STORAGE BATTERY, AND ELECTRIC POWER CONTROL SYSTEM

CROSS-REFERENCE TO RELATED APPLICATIONS

This application is a Continuation of International Application No. PCT/JP2012/070716 filed on Aug. 8, 2012, which is based upon and claims the benefit of priority from U.S. Patent Application No. 61/525,218 filed on Aug. 19, 2011, the contents all of which are incorporated herein by reference.

FIELD OF THE INVENTION

The present invention relates to a method of controlling a storage battery, an apparatus for controlling a storage battery, and an electric power control system, and more particularly to a method of controlling a storage battery, an apparatus for controlling a storage battery, and an electric power control system, which are suitable for controlling a sodium-sulfur battery that is used as a storage battery, for example.

DESCRIPTION OF RELATED ART

Generally, the adjustment of frequencies in an electric power system and the adjustment of electric power supplies with respect to electric power demands in an electric power system are carried out by a plurality of electric power generators and storage batteries, which are included in the electric power system. Adjustment of the difference between generated electric power and planned electric power of natural-energy-based electric generating apparatus, and mitigation of variations in generated electric power of natural-energy-based electric power generating apparatus also are performed by a plurality of electric power generators and storage batteries. Storage batteries are capable of varying the output electric power thereof more quickly than general electric generators, and hence are effective to adjust frequencies in an electric power system, as well as to adjust differences between generated electric power and planned electric power of natural-energy-based electric generating apparatus and electric power supplies with respect to electric power demands in an electric power system.

High-temperature storage batteries that can be connected to an electric power system include a sodium-sulfur battery (hereinafter referred to as an "NAS battery"), for example. A NAS battery is a high-temperature secondary battery having metal-sodium and sulfur as active materials which are isolated and housed by a solid-state electrolytic tube. When a NAS battery is heated to a high temperature in a range from 290 to 350° C., the active materials are melted and cause an electrochemical reaction to thereby generate energy. A NAS battery is usually used as a battery module made up of a plurality of upstanding unit cells.

A high-temperature storage battery is required to maintain an operating temperature in a range from 290 to 350° C. within the battery module. Heat for keeping the operating temperature within the battery module is supplied from a heater, which is placed in the housing of the battery module, as well as from the storage battery itself (heat. i.e. Joule heat, from the battery cells at the time that the storage battery is charged and discharged, and also from electrically conductive parts in the battery module) (see Japanese Laid-Open Patent Publication No. 2004-047208 and Japanese Laid-Open Patent Publication No. 2000-182662). According to Japanese Laid-Open Patent Publication No. 2004-047208, the housing is thermally insulated in order to provide a heat storage effect.

Heretofore, the method disclosed in Japanese Laid-Open Patent Publication No. 2004-111123 has also been used. According to the disclosed method, when a sodium-sulfur battery module is operated in a preset charging and discharging pattern, the amount of heat generated by the battery module is predicted, and the thermal insulation of the battery module is adjusted in order to substantially equalize the predicted heat amount and the amount of heat radiated from the battery module with each other, so as to mitigate the amount of electric power supplied to a heater for heating the battery module.

If a high-temperature storage battery is used as an electric power source in the case of a power outage, the storage battery may be operated within a wait time zone (normal zone) according to the following two processes.

According to the first process, the storage battery is kept fully charged throughout the wait time zone. More specifically, as shown in FIG. 25 of the accompanying drawings, the storage battery is kept in a state of charge (SOC) of 100% at all times without being charged or discharged. However, since the storage battery has to be kept at an operating temperature (e.g., 300° C.) for a SOC of 100%, the heater of the storage battery must be supplied with electric power at all times, resulting in a reduction in system efficiency.

The second process utilizes the method disclosed in Japanese Laid-Open Patent Publication No. 2004-111123. In order to level out loads such as peak shifts, the storage battery is charged and discharged according to a preset charging and discharging pattern, as shown in FIG. 26 of the accompanying drawings. According to such a preset charging and discharging pattern, the storage battery stops being discharged prior to a discharging end point, in order to leave a certain amount of energy to be used as a power supply in the event of a power outage. As shown in FIG. 26, the storage battery starts being discharged at 7 o'clock and stops being discharged at 16 o'clock, and then starts being charged at 21 o'clock and stops being charged at 4 o'clock on the next day. If the storage battery is a NAS battery, then since the storage battery causes an exothermic reaction when it is discharged and an endothermic reaction when it is charged, the temperature of the storage battery rises when discharged and falls when charged. Moreover, since Joule heat is generated when the storage battery is discharged and charged and is supplied to the storage battery, the heater of the storage battery may be supplied with electrical energy only during the period from 6 o'clock to 8 o'clock, which is much shorter than in the first process.

According to the second process, the electric power supplied to the heater in order to heat the storage battery when the storage battery is charged and discharged may be reduced. However, in the event of a power outage immediately after discharging of the storage battery is completed, only a small amount of energy is stored in the storage battery. Therefore, the stored energy available for use as a power source in the event of a power outage is small.

SUMMARY OF THE INVENTION

The present invention has been made in view of the above problems. It is an object of the present invention to provide a method of controlling a storage battery, an apparatus for controlling a storage battery, and an electric power control system, which allow the storage battery to be used effectively for contributing to stabilization of an electric power system, and which can reduce the amount of electric power supplied to a heater of the storage battery for thereby enabling higher system efficiency.

[1] According to a first aspect of the invention, there is provided a method of controlling a high-temperature storage battery connected to an electric power system, comprising the steps of, when the temperature of the storage battery is equal to or lower than a reference temperature, charging and discharging the storage battery with charging and discharging electric power, which is the sum of charging and discharging electric power based on a preset process of operating the storage battery and charging and discharging electric power corresponding to charging and discharging cycles each of a continuous charging time of 1 hour or shorter and a continuous discharging time of 1 hour or shorter, for thereby supplying thermal energy to the storage battery.

The electric power supplied to a heater of the storage battery can thus be reduced, thereby increasing the system efficiency of the storage battery. The system efficiency of the storage battery may be expressed as follows:

$$\eta sys = Ed/(Ec+Eh)$$

ηsys: system efficiency (%)
Ed: total amount of discharging electric power during period T (Wh)
Ec: total amount of charging electric power during period T (Wh)
Eh: total amount of electric power consumed by the heater during period T (Wh)
Period T: one week, for example.

[2] According to the first aspect of the invention, charging and discharging electric power from the storage battery in the charging and discharging cycles may comprise charging and discharging electric power based on a differential signal, the differential signal being based on a difference between the frequency of the electric power system and a reference frequency. Such an arrangement contributes to stabilization of the frequency of the electric power system.

[3] According to the first aspect of the invention, charging and discharging electric power from the storage battery in the charging and discharging cycles may comprise charging and discharging electric power based on a differential signal, the differential signal being based on a difference between electric power generated by the electric power system and electric power demands for the electric power system. A system administrator (system administrating apparatus) predicts an electric power demand from instant to instant in the electric power system, and adjusts the output electric power from an electric generator, which is capable of increasing and reducing the electric power supplied to the electric power system and the output power of the storage battery in order to supply an amount of electric power that is equal to the predicted electric power demand. Alternatively, the electric power supply and the electric power demand are adjusted such that the difference between the actual electric power demand and the electric power supply which is based on the predicted electric power demand will be reduced. The charging and discharging electric power of the storage battery may be adjusted based on a control signal for adjusting electric power supplies and electric power demands in the electric power system.

[4] According to the first aspect of the invention, charging and discharging electric power from the storage battery in the charging and discharging cycles may comprise charging and discharging electric power based on a differential signal, the differential signal being based on a difference between electric power generated by a natural-energy-based electric generating apparatus connected to the electric power system and planned output electric power. Such an arrangement contributes to stabilization of the output electric power of a natural-energy-based electric generating apparatus.

[5] In aspects [2] through [4], charging and discharging electric power from the storage battery in the charging and discharging cycles may comprise charging and discharging electric power based on a high-frequency component of the differential signal. Such an arrangement is capable of minimizing variations in the SOC (state of charge) of the storage battery.

[6] The high-frequency component may be extracted by a high-pass filter having a cut-off frequency of 1/3600 Hz or lower.

[7] According to the first aspect of the invention, the mount of thermal energy supplied to the storage battery in the charging and discharging cycles may be adjusted by increasing and reducing an average amplitude of the charging and discharging electric power. Such an arrangement makes it possible to control the temperature of the storage battery within a suitable range.

[8] According to the first aspect of the invention, the amount of thermal energy supplied to the storage battery in the charging and discharging cycles may be adjusted by increasing and reducing the ratio of a time during which the charging and discharging cycles are performed to a time during which the charging and discharging cycles are not performed, within a time zone in which the storage battery is in a standby state. Such an arrangement makes it possible to control the temperature of the storage battery within a suitable range.

[9] According to the first aspect of the invention, a target temperature Tb to be achieved by the storage battery by charging and discharging the storage battery with the sum of the charging and discharging electric power, based on the preset process of operating the storage battery and the charging and discharging electric power corresponding to the charging and discharging cycles, and a target temperature Tc to be achieved by the storage battery by controlling a heater thereof, may be set to satisfy the relationship Tb>Tc. Since priority is given to supply of thermal energy to the storage battery with additional charging and discharging electric power over supply of thermal energy to the storage battery with the heater, electric power loss caused by the heater can be reduced, and the storage battery can be utilized effectively to stabilize the frequency.

[10] According to the first aspect of the invention, a preset temperature may be established as an upper-limit temperature at which the storage battery is allowed to be charged and discharged, and when the temperature of the storage battery becomes equal to or higher than the preset temperature, the storage battery may not be charged and discharged with the sum of the charging and discharging electric power based on the preset process of operating the storage battery and the charging and discharging electric power corresponding to the charging and discharging cycles. Supply of additional charging and discharging electric power to the storage battery prevents the temperature of the storage battery from rising too high while basic charging and discharging is performed (charging and discharging based on the preset process of operating the storage battery).

[11] According to a second aspect of the invention, there is provided an apparatus for controlling a storage battery with the method according to the first invention.

The storage battery can effectively be utilized to contribute to stabilization of the electric power system. The electric power supplied to a heater of the storage battery can thus be reduced, thereby increasing the system efficiency of the storage battery.

[12] An electric power control system according to a third aspect of the invention incorporates therein the apparatus according to the second aspect of the invention, wherein the frequency of the electric power system is input to the apparatus from a frequency meter, which is combined with the electric power system.

[13] An electric power control system according to a fourth aspect of the invention incorporates therein the apparatus according to the second aspect of the invention, wherein the frequency of the electric power system or the difference between the frequency of the electric power system and a reference frequency is input to the apparatus from an electric power company or a system administrator.

[14] An electric power control system according to a fifth aspect of the invention incorporates therein the apparatus according to the second aspect of the invention, wherein the preset process of operating the storage battery comprises a process of supplying electric power from the storage battery to a load within a time zone in which the electric power system experiences a power outage.

[15] An electric power control system according to a sixth aspect of the invention incorporates therein the apparatus according to the second aspect of the invention, wherein the preset process of operating the storage battery comprises a process of leveling loads.

[16] An electric power control system according to a seventh aspect of the invention incorporates therein the apparatus according to the second aspect of the invention, wherein the preset process of operating the storage battery comprises a process of smoothing natural-energy-based electric power.

As described above, the method of controlling a storage battery, the apparatus for controlling a storage battery, and the electric power control system according to the present invention enable a storage battery to be used effectively for contributing to stabilization of an electric power system, and can reduce electric power supplied to a heater of the storage battery for thereby enabling higher system efficiency.

The above and other objects, features, and advantages of the present invention will become more apparent from the following description when taken in conjunction with the accompanying drawings in which preferred embodiments of the present invention are shown by way of illustrative example.

BRIEF DESCRIPTION OF DRAWINGS

FIG. 5 is a diagram showing an example of the manner in which a command charging and discharging electric power value is calculated from a basic charging and discharging electric power value and an additional charging and discharging electric power value;

FIG. 13 is a diagram showing transitions of output electric power from a storage battery, heater electric power, the temperature of the storage battery, and the SOC of the storage battery in the processing sequence of the second higher-level controller;

FIG. 18 is a diagram showing transitions of a command charging and discharging electric power value, heater electric power, the temperature of the storage battery, and the SOC of the storage battery in the processing sequence of the fourth higher-level controller;

FIG. 25 is a diagram showing problems of an operating process (first process) in a wait time zone (normal zone) for a high-temperature storage battery.

DETAILED DESCRIPTION OF THE INVENTION

Methods of controlling a storage battery, apparatus for controlling a storage battery, and electric power control systems according to embodiments of the present invention will be described below with reference to FIGS. 1 through 24.

According to the embodiments of the present invention, when the temperature of a high-temperature storage battery is equal to or lower than a reference temperature, the storage battery is charged and discharged with charging and discharging electric power, which is the sum of charging and discharging electric power (basic charging and discharging electric power) based on a preset storage battery operating process and charging and discharging electric power (additional charging and discharging electric power) corresponding to a charging and discharging cycle of a continuous charging time and a continuous discharging time, each of which is equal to or smaller than 1 hour, whereby the storage battery is supplied with thermal energy.

The purpose (basic applications) of charging and discharging a storage battery with basic charging and discharging electric power is representative of basic applications that are preferentially served by the storage battery to which control methods according to embodiments of the present embodiments are applied. Such basic applications include, for example, an application as an electric power source for use in the case of a power outage (outage power supply), an application (load leveling) for operation according to a pattern for load leveling, and an application (natural energy smoothing) for operation for absorbing and mitigating variations in electric power generated from natural energy.

According to the embodiments, the high-temperature storage battery comprises a sodium-sulfur battery. However, the present invention also is applicable to a sodium-nickel chloride battery, a sodium molten salt battery, a lithium iron sulfide battery, or the like.

Figure 1:
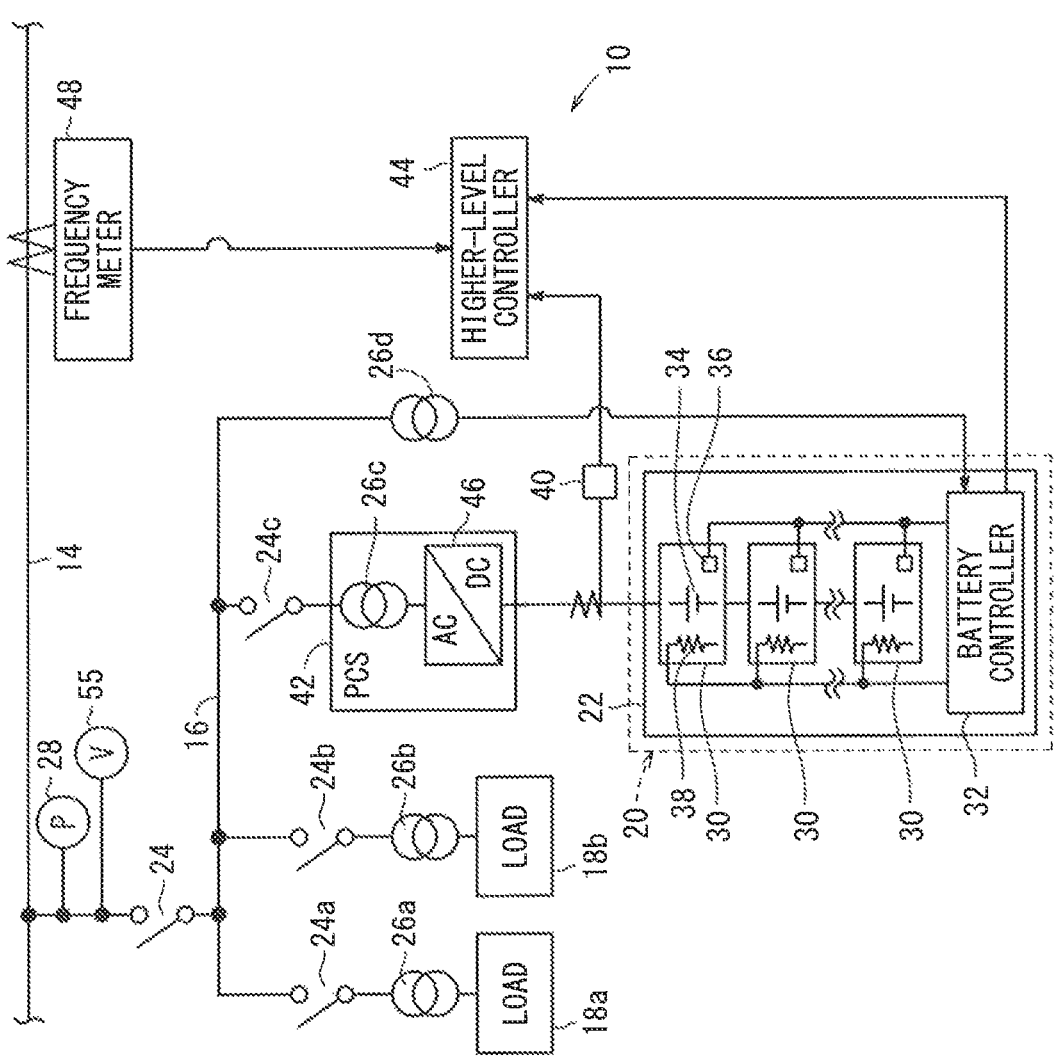
FIG. 1 is a block diagram of an electric power system incorporating an electric power control system according to an embodiment of the present invention.

As shown in FIG. 1, an electric power system 12, which incorporates therein an electric power control system 10 according to an embodiment of the present invention, includes a bus bar 14 that is supplied with commercial electric power, a main line 16 that is supplied with electric power from the bus bar 14, and a plurality of loads (first load 18a and second load 18b) and a storage battery 20, which are connected to the main line 16. The storage battery 20 comprises one or more battery units 22. In FIG. 1, the storage battery 20 comprises a single battery unit 22 as a typical example.

The main line 16 is connected to the bus bar 14 through a main circuit breaker 24. The first load 18a is connected to the main line 16 through a first circuit breaker 24a and a first transformer 26a, and the second load 18b is connected to the main line 16 through a second circuit breaker 24b and a second transformer 26b. Electric power on the bus bar 14 is measured by an electric power sensor 28.

The battery unit 22 includes a plurality of high-temperature battery modules 30, and a battery controller 32 for controlling the battery modules 30. Each of the battery modules 30 includes a plurality of battery cells 34, a temperature sensor 36 for detecting the temperature in the battery modules 30, and a heater 38 for supplying thermal energy. An SOC calculator 40 is connected to the battery unit 22 for determining an entire amount of electrical energy stored in the battery unit 22, i.e., the state of charge (SOC) of the battery unit 22. The SOC calculator 40 may calculate the SOC of the battery unit 22 by detecting a charging end point based on the voltage across the battery cells 34, and integrating an electric current charged and discharged from the battery cells 34 from the state of the charging end point.

The electric power control system 10 according to the present embodiment includes a PCS (Power Conditioning System) 42, which is connected to the battery unit 22, and a higher-level controller 44 for outputting charging and discharging commands to the PCS 42.

The PCS 42, which is connected to the main line 16 through a third circuit breaker 24c, includes a DC-to-AC converter 46, and a third transformer 26c, which is connected between an AC terminal of the DC-to-AC converter 46 and the third circuit breaker 24c. The PCS 42 charges and discharges the storage battery 20 according to a charging and discharging command from the higher-level controller 44. The storage battery 20 is connected to a DC terminal of the DC-to-AC converter 46 of the PCS 42.

The battery controller 32 controls the heaters 38 based on temperature information from the temperature sensors 36 of the respective battery modules 30. The heaters 38 are supplied with electric power from the main line 16 through a fourth transformer 26d and the battery controller 32. The battery controller 32 supplies the temperature information from the temperature sensors 36 to the higher-level controller 44. The SOC calculator 40 supplies SOC information to the higher-level controller 44.

The bus bar 14 is combined with a frequency meter 48, which detects the frequency (system frequency f) of an electric current that flows through the bus bar 14. Information representing the frequency detected by the frequency meter 48 is supplied from the frequency meter 48 to the higher-level controller 44.

The main circuit breaker 24 and the first through third circuit breakers 24a, 24b, 24c open and close in the following manner. During a time zone in which the bus bar 14 is supplied with electric power, the main circuit breaker 24 and the first through third circuit breakers 24a, 24b, 24c are closed (electrically connected). Conversely, during a time zone in which the bus bar 14 is not supplied with electric power, i.e., during a time zone in which the electric power system 12 is experiencing a power outage, the third circuit breaker 24c is closed (electrically connected) and the main circuit breaker 24 is opened (electrically disconnected). One of the first circuit breaker 24a and the second circuit breaker 24b, which corresponds to a load to be preferentially supplied with electric power, is closed.

Configurational details and processing operations of the higher-level controller 44 will be described below with reference to FIGS. 2 through 24.

Figure 2:
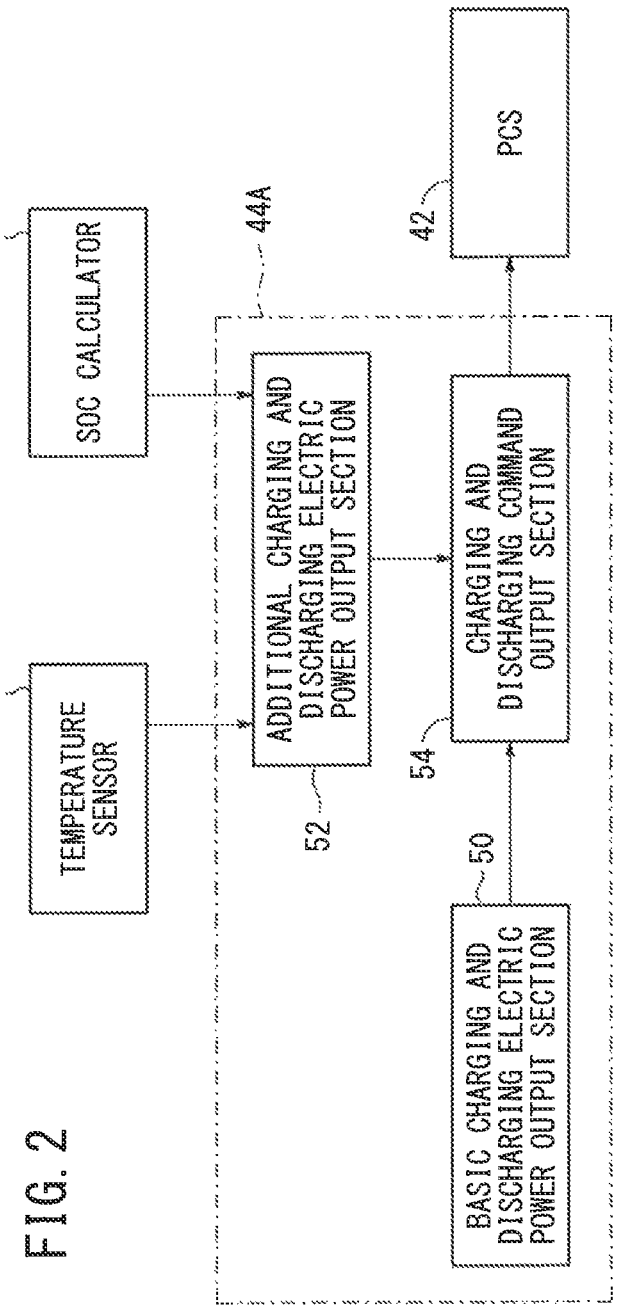
FIG. 2 is a block diagram of a first higher-level controller.

A higher-level controller according to a first embodiment of the present invention (hereinafter referred to as a "first higher-level controller 44A") will be described below with reference to FIGS. 2 through 6. As shown in FIG. 2, the first higher-level controller 44A includes a basic charging and discharging electric power output section 50 for outputting a basic charging and discharging electric power value based on a preset process of operating the storage battery 20, an additional charging and discharging electric power output section 52 for calculating and outputting an additional charging and discharging electric power value, and a charging and discharging command output section 54 for calculating a command charging and discharging electric power value from the basic charging and discharging electric power value and the additional charging and discharging electric power value, and for outputting the command charging and discharging electric power value to the PCS 42.

For example, if the preset method of operating the storage battery 20 is an operating method that uses the storage battery 20 as an electric power source for use in the case of a power outage, then the basic charging and discharging electric power output section 50 outputs 0 (zero) when the electric power system 12 is not experiencing a power outage, and outputs a basic charging and discharging electric power value, which is equal to the electric power consumed by the load when the electric power system 12 experiences a power outage. The higher-level controller 44 determines whether or not the electric power system 12 is experiencing a power outage based on voltage value information from a voltage sensor 55, which is connected to the bus bar 14.

If the preset method of operating the storage battery 20 is an operating method that operates the storage battery 20 according to a pattern for load leveling, then the basic charging and discharging electric power output section 50 outputs a basic charging and discharging electric power value depending on a preset charging and discharging pattern. For example, at each of certain prescribed times, the basic charging and discharging electric power output section 50 outputs a preset charging and discharging electric power value as a basic charging and discharging electric power value.

If the preset method of operating the storage battery 20 is an operating method that operates the storage battery 20 in order to absorb and mitigate variations in electric power generated from natural energy, then the basic charging and discharging electric power output section 50 outputs a basic charging and discharging electric power value, which acts to absorb and mitigate variations in electric power generated from natural energy.

The additional charging and discharging electric power output section 52 is supplied with temperature information from the temperature sensors 36 in the respective battery modules 30, and with SOC information from the SOC calculator 40. The additional charging and discharging electric power output section 52 outputs an additional charging and discharging electric power value other than 0 when the temperatures of the battery modules 30 are equal to or lower than a reference temperature (a preset temperature Ta, to be described later) and the SOC falls within a reference range, e.g., from 10% to 90%.

The charging and discharging command output section 54 calculates a command charging and discharging electric power value from the basic charging and discharging electric power value output by the basic charging and discharging electric power output section 50, and the additional charging and discharging electric power value output by the additional charging and discharging electric power output section 52. The charging and discharging command output section 54 outputs the command charging and discharging electric power value to the PCS 42.

Preset temperatures of the battery modules 30 will be described below. The preset temperatures include an upper-limit temperature Tmax2 (e.g., 340° C.), an upper-limit temperature Tmax1 (e.g., 330° C.) below the upper-limit temperature Tmax2, a preset temperature Ta (e.g., 305° C.) below the upper-limit temperature Tmax1, a target temperature Tb (e.g., 300° C.) below the preset temperature Ta, and a target temperature Tc (e.g., 295° C.) below the target temperature Tb.

The upper-limit temperature Tmax2 is an upper-limit temperature under which the storage battery 20 is allowed to be charged and discharged. When the temperature of the storage battery 20 becomes equal to or higher than the upper-limit temperature Tmax2, the storage battery 20 is stopped forcibly from being charged and discharged. The upper-limit temperature Tmax1 is an upper-limit temperature by which an additional charging and discharging electric power value is calculated. When the temperature of the storage battery 20 becomes equal to or higher than the upper-limit temperature Tmax1, the additional charging and discharging electric power value is set to 0. The preset temperature Ta is a reference temperature for determining whether or not the additional charging and discharging electric power value may be set to a value other than 0. When the temperature of the storage battery 20 becomes equal to or lower than the preset temperature Ta, the additional charging and discharging electric power value is allowed to be set to a value other than 0. The preset temperature Ta hereinafter will be referred to as a "reference temperature Ta". The target temperature Tb is a target temperature to be achieved by the battery modules 30 when the battery modules 30 are additionally charged and discharged. The target temperature Tc is a target temperature to be achieved by the battery modules 30 when the battery modules are heated by the heaters 38. The battery controller 32 supplies electric power to the heaters 38 of the battery modules 30, the temperatures of which are lower than the target temperature Tc, in order to supply thermal energy to the battery modules 30 for making the temperatures of the battery modules 30 approach the target temperature Tc.

The charging and discharging pattern and the preset temperatures (the upper-limit temperatures Tmax1, Tmax2, the reference temperature Ta, and the target temperatures Tb, Tc), which are output from the basic charging and discharging electric power output section 50, are stored in a memory (not shown) in the first higher-level controller 44A.

A processing sequence of the first higher-level controller 44A will be described below with reference to the flowchart shown in FIG. 3.

Figure 3:
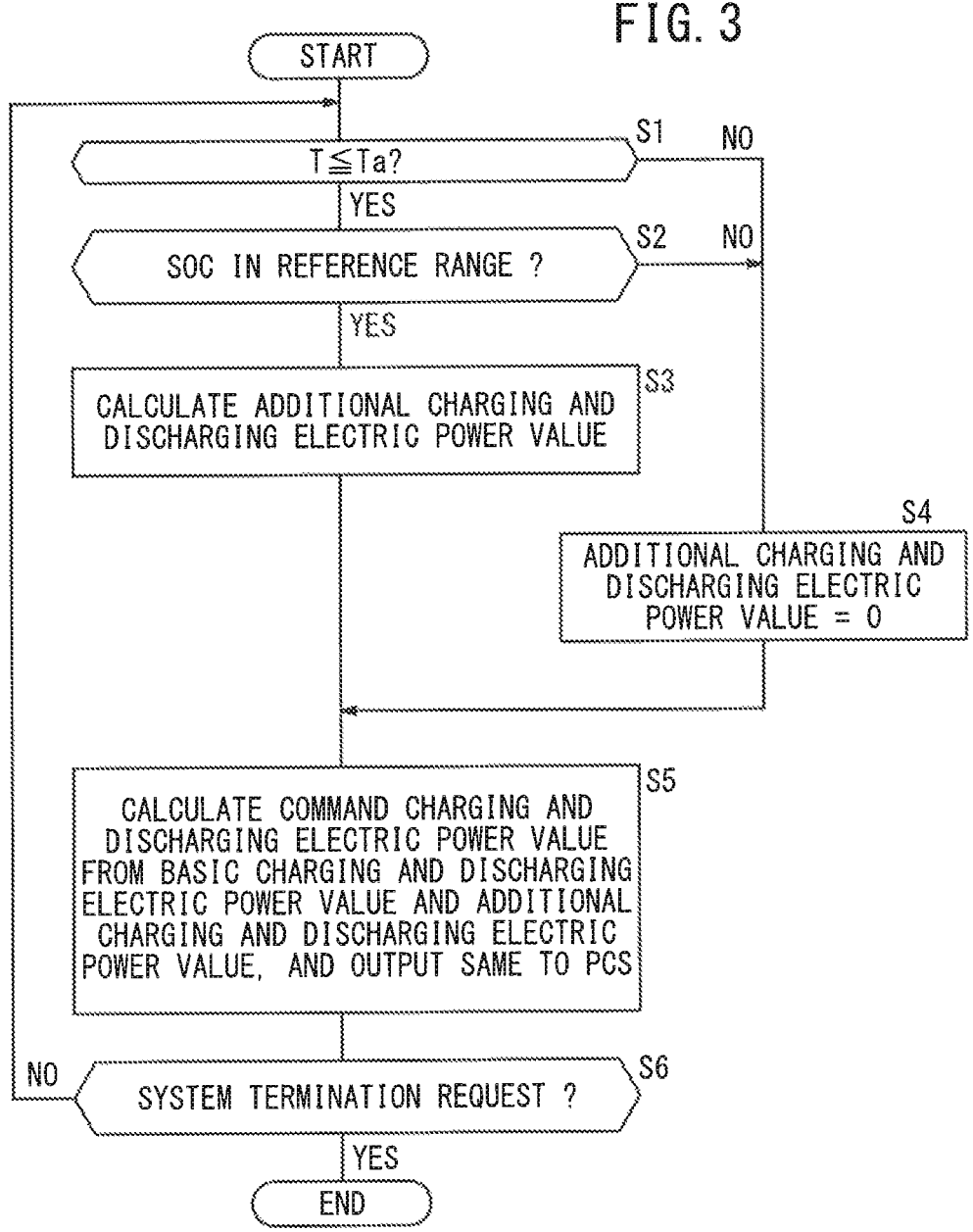
FIG. 3 is a flowchart of a processing sequence of the first higher-level controller.

In step S1 shown in FIG. 3, the additional charging and discharging electric power output section 52 determines whether or not the temperature of the storage battery 20 (i.e., the temperatures in the battery modules 30) is equal to or lower than the reference temperature Ta (e.g., 305° C.) by comparing the temperature indicated by the temperature information from the battery controller 32 with the reference temperature Ta. If the temperature of the storage battery 20 is equal to or lower than the reference temperature Ta, then control proceeds to step S2, during which the additional charging and discharging electric power output section 52 determines whether or not the SOC of the storage battery 20 falls within a reference range by comparing the SOC (percentage) represented by the SOC information from the SOC calculator 40 with the reference range (e.g., a range from 10% to 90%). If the SOC of the storage battery 20 falls within the reference range, then control proceeds to step S3, during which the additional charging and discharging electric power output section 52 calculates an additional charging and discharging electric power value depending on the difference between the input temperature information (indicative of the temperatures in the battery modules 30) and the target temperature Tb. At this time, the additional charging and discharging electric power output section 52 sets an additional charging and discharging electric power value, such that each of the charging and discharging times will lie within a range from about several seconds to 1 hour.

In step S1, if the additional charging and discharging electric power output section 52 determines that the temperature T of the storage battery 20 is higher than the reference temperature Ta, or in step S2, if the additional charging and discharging electric power output section 52 determines that the SOC of the storage battery 20 does not fall within the reference range, then control proceeds to step S4, during which the additional charging and discharging electric power output section 52 outputs 0 (zero) as the additional charging and discharging electric power value to the charging and discharging command output section 54.

After step S3 or step S4, control proceeds to step S5, during which the charging and discharging command output section 54 calculates a command charging and discharging electric power value from the basic charging and discharging electric power value and the additional charging and discharging electric power value, and then outputs the command charging and discharging electric power value to the PCS 42. Thereafter, control proceeds to step S6, during which the first higher-level controller 44A determines whether or not there is a system termination request. If a system termination request is not present, then control returns to step S1 and steps S1 through S6 are repeated. If there is a system termination request, then the processing sequence of the first higher-level controller 44A is brought to an end.

Figure 4:
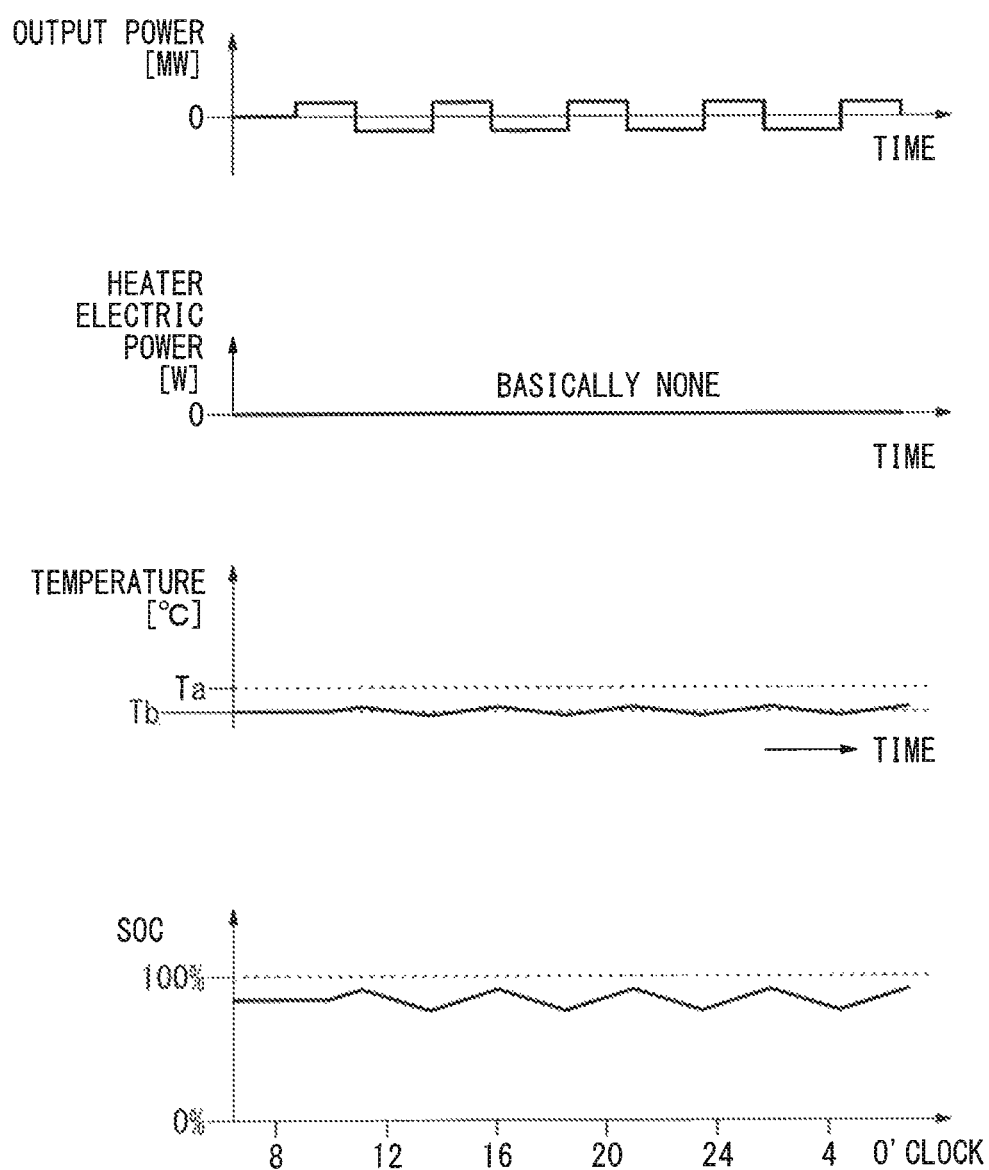
FIG. 4 is a diagram showing transitions of output electric power from a storage battery, heater electric power, the temperature of the storage battery, and the SOC of the storage battery in the processing sequence of the first higher-level controller.

According to the first embodiment, if the temperature T of the storage battery 20 is equal to or lower than the reference temperature Ta, and if the SOC of the storage battery 20 falls within the reference range, then the additional charging and discharging electric power value, which depends on the difference between the temperature T of the storage battery 20 and the reference temperature Ta, is added to the basic charging and discharging electric power value, and the sum thereof is output to the PCS 42 as the command charging and discharging electric power value. Thus, as shown in FIG. 4, when the temperature T of the storage battery 20 becomes equal to or lower than the reference temperature Ta, the storage battery 20 is charged and discharged in repeated charging and discharging cycles, each consisting of a continuous charging time and a continuous discharging time, and each ranging from about several seconds to 1 hour, and the storage battery 20 outputs an amount of electric power dependent on the charging and discharging cycles. Therefore, the storage battery 20 is supplied with thermal energy and the temperature T of the storage battery 20 is kept within the vicinity of the target temperature Tb (target temperature Tb ±5° C.). Consequently, the heaters 38 of the storage battery 20 are not supplied with electric power (heater electric power) except when the storage battery 20 is activated, and hence the system efficiency of the storage battery 20 is increased. In particular, since the battery cells 34 themselves become heated when the storage battery 20 is supplied with thermal energy as a result of being charged and discharged, unlike when the storage battery 20 is supplied with thermal energy from the heaters 38, the battery cells 34 are heated uniformly. Furthermore, inasmuch as the battery cells 34 are self-heated, the battery cells 34 are supplied with thermal energy more efficiently than if the battery cells 34 were supplied with thermal energy from the heaters 38, which are disposed outside of the battery cells 34 (within the battery modules 30). Further, since each of the continuous charging time and the continuous discharging time is short, i.e., ranging from several seconds to 1 hour, any reduction in the SOC is small when the storage battery 20 is discharged in one cycle, and the reduction in the SOC is made up for in the next cycle. Consequently, the SOC is prevented from being reduced significantly, and can be maintained substantially constant (e.g., in the vicinity of 80%). The determining process of step S2 serves to prevent the storage battery 20 from being discharged when the SOC is nearly 100% or 0%. However, since as described above, the SOC of the storage battery 20 can be kept substantially constant, the determining process of step S2 may be dispensed with.

Generally, as the sum of the absolute value of a charging amount of electric power (time integral of charging electric power) and the absolute value of a discharging amount of electric power (time integral of discharging electric power) becomes greater, the Joule heat generated by the storage battery 20 itself when the storage battery 20 is charged and discharged also is greater. (In the present embodiment, since the charging electric power value and the charging amount of electric power are negative and the discharging electric power value and the discharging amount of electric power are positive, the absolute value of the charging amount of electric power and the absolute value of the discharging amount of electric power will be referred to hereinafter.)

FIG. 5 shows an example in which a command charging and discharging electric power value is calculated from a basic charging and discharging electric power value and an additional charging and discharging electric power value. When the additional charging and discharging electric power value is added to the basic charging and discharging electric power value, the command charging and discharging electric power value (the sum of the absolute values of the charging amount of electric power and the discharging amount of electric power) is greater than if the basic charging and discharging electric power value were used as the command charging and discharging electric power value, and thus, more Joule heat is generated in the storage battery 20.

More specifically, as shown in FIG. 5, a basic charging and discharging electric power value is set to +0.1 MW over the discharging time t1, and to +0.1 MW over the charging time t2. Therefore, the sum of the absolute values of the charging amount of electric power and the discharging amount of electric power may be represented by 0.1·t1+0.1·t2 MWh. If it is assumed that an additional charging and discharging electric power value is set to +0.5 MW over the discharging time t1, and to −0.5 MW over the charging time t2, then the sum of the absolute values of the command charging amount of electric power and the command discharging amount of electric power may be represented by 0.6·t1+0.4·t2 MWh, it is therefore obvious that the command charging and discharging electric power value (the sum of the absolute values of the charging amount of electric power and the discharging amount of electric power) is made greater than if the basic charging and discharging electric power value were used as the command charging and discharging electric power value, and thus, more Joule heat is generated in the storage battery 20.

Figure 6:
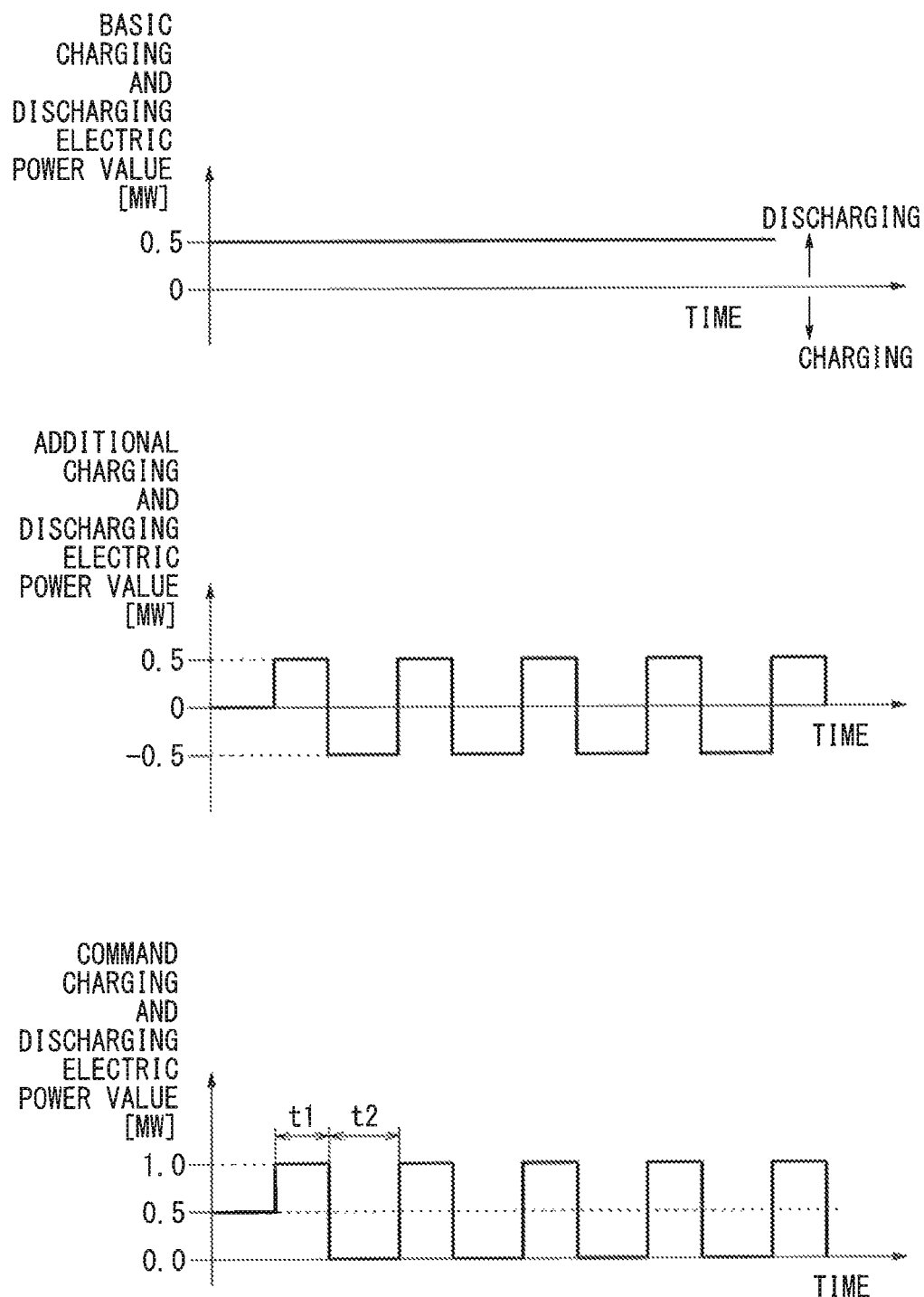
FIG. 6 is a diagram showing another example of the manner in which a command charging and discharging electric power value is calculated from a basic charging and discharging electric power value and an additional charging and discharging electric power value.

FIG. 6 shows another example in which a command charging and discharging electric power value is calculated from a basic charging and discharging electric power value and an additional charging and discharging electric power value. According to the example shown in FIG. 6, even though the basic charging and discharging electric power value and the additional charging and discharging electric power value are added together, the command charging and discharging electric power value (the sum of the absolute values of the charging amount of electric power and the discharging amount of electric power) remains essentially unchanged from the basic charging and discharging electric power value that is used as the command charging and discharging electric power value.

More specifically, as shown in FIG. 6, a basic charging and discharging electric power value is set to +0.5 MW over the discharging time t1, and to +0.5 MW over the charging time t2. Therefore, the sum of the absolute values of the charging amount of electric power and the discharging amount of electric power may be represented by 0.5·t1+0.5·t2 MWh. If it is assumed that an additional charging and discharging electric power value is set to +0.5 MW over the discharging time t1, and to −0.5 MW over the charging time t2, similar to the case of the example shown in FIG. 5, then the sum of the absolute values of the command charging amount of electric power and the command discharging amount of electric power may be represented by 1.0·t1 MWh. Assuming that the charging time t1 and the charging time t2 are essentially the same as each other, then the command charging and discharging electric power value (the sum of the absolute values of the charging amount of electric power and the discharging amount of electric power) remains essentially unchanged from the basic charging and discharging electric power value that is used as the command charging and discharging electric power value.

If the basic charging and discharging electric power value is relatively large, as shown in FIG. 6, then the temperature T of the storage battery 20 is unlikely to become equal to or smaller than the reference temperature Ta (e.g., 305° C.). Even if the temperature T of the storage battery 20 becomes equal to or smaller than the reference temperature Ta, since the basic charging and discharging electric power value is relatively large, the temperature T of the storage battery 20 often rises to a value that is equal to or higher than the reference temperature Ta. If the temperature T of the storage battery 20 is lower than the reference temperature Ta, and if the situation shown in FIG. 6 continues, then the amplitude of the additional charging and discharging electric power value is increased, so that the command charging and discharging electric power value (the sum of the absolute values of the charging amount of electric power and the discharging amount of electric power) produced when the additional charging and discharging electric power value is added to the basic charging and discharging electric power value is made greater than if the basic charging and discharging electric power value were used as the command charging and discharging electric power value.

A higher-level controller according to a second embodiment of the present invention (hereinafter referred to as a "second higher-level controller 44B") will be described below with reference to FIGS. 7 through 13.

According to the second embodiment, basic applications include, for example, an application as an outage power supply and an application as a power supply for performing load leveling. The purpose (i.e., additional applications) of charging and discharging the storage battery with additional charging and discharging electric power representative of applications of using a storage battery, together with other adjusting means, to which the control method according to the second embodiment is applied. The additional applications include, for example, an application for frequency adjustment, and an application for adjusting electric power supplies with respect to electric power demands.

Figure 7:
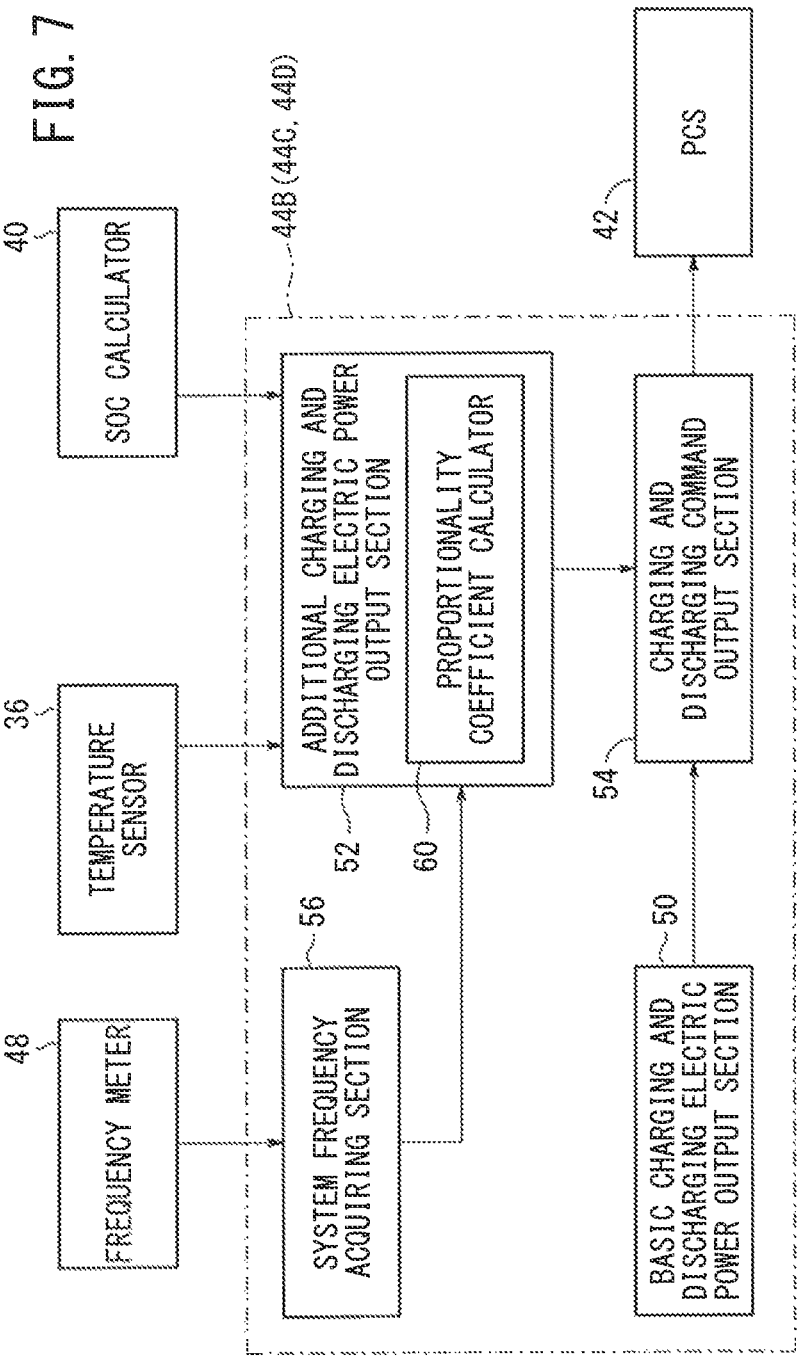
FIG. 7 is a block diagram of a second higher-level controller (a third higher-level controller, a fourth higher-level controller)

As shown in FIG. 7, the second higher-level controller 44B includes the basic charging and discharging electric power output section 50, the additional charging and discharging electric power output section 52, and the charging and discharging command output section 54, which have already been described above, in addition to a system frequency acquiring section 56 for acquiring a system frequency f. The additional charging and discharging electric power output section 52 includes a proportionality coefficient calculator 60 for calculating a proportionality coefficient K based on the difference $\Delta T$ between the temperature of the storage battery 20 (battery temperature T) and the target temperature Tb (e.g., 300° C.). The additional charging and discharging electric power output section 52 calculates an additional charging and discharging electric power value based on a difference $\Delta f$ (differential signal) between the system frequency f and a reference frequency fa, and then outputs the calculated additional charging and discharging electric power value to the charging and discharging command output section 54.

Figure 8:
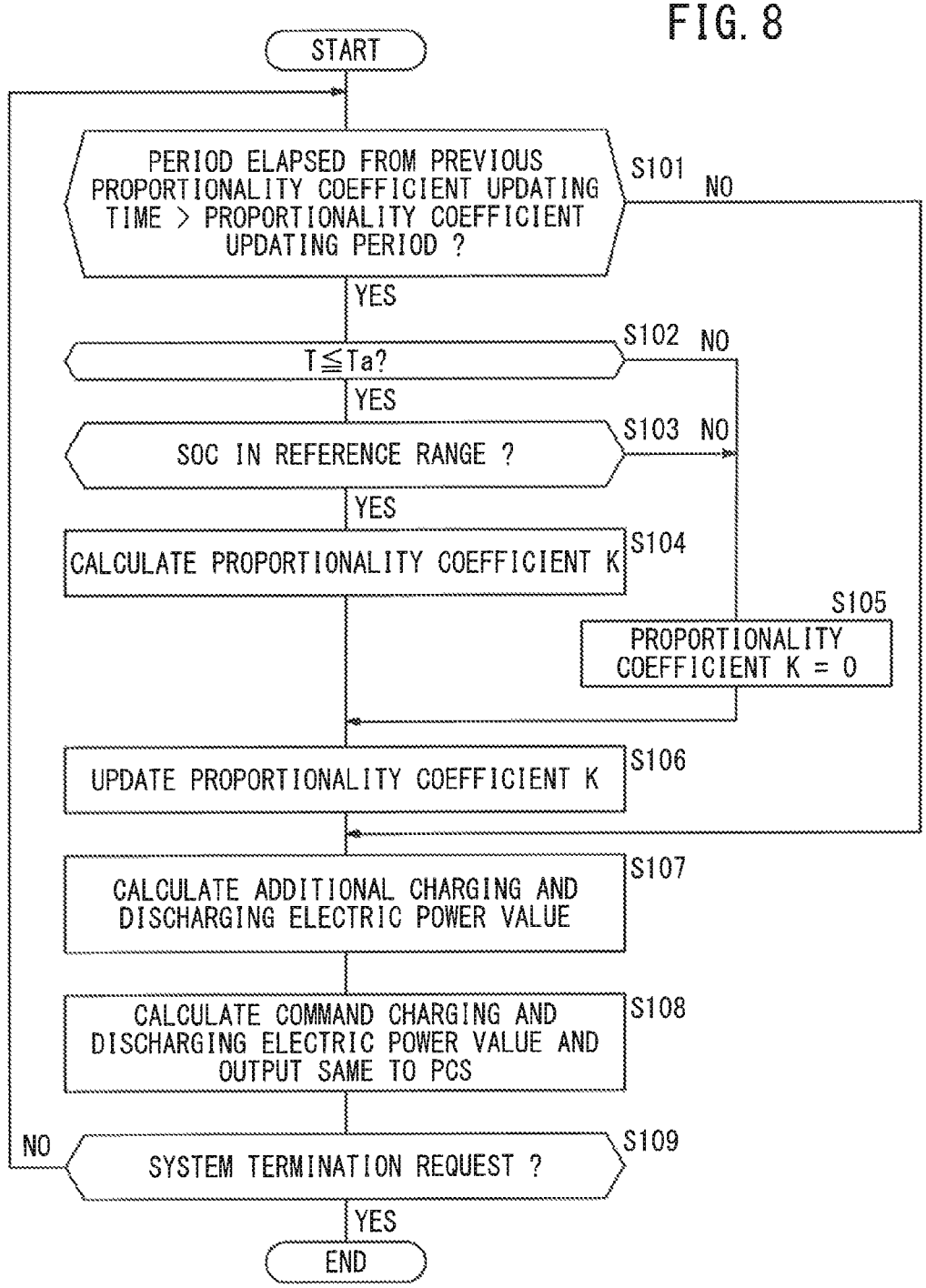
FIG. 8 is a flowchart of a processing sequence of the second higher-level controller.

A processing sequence of the second higher-level controller 44B will be described below with reference to the flowchart shown in FIG. 8. FIG. 8 will also be referred to with respect to a processing sequence of a fifth higher-level controller 44E, to be described later.

In step S101 shown in FIG. 8, the additional charging and discharging electric power output section 52 determines whether or not the period that has elapsed from the previous time at which the proportionality coefficient was updated (previous proportionality coefficient updating time) has reached a preset period for updating the proportionality coefficient (proportionality coefficient updating period). If the control sequence has gone through step S101 for the first time after the second higher-level controller 44B has been activated, if the period that has elapsed from the previous proportionality coefficient updating time has reached the proportionality coefficient updating period, then control proceeds to step S102, during which the additional charging and discharging electric power output section 52 determines whether or not the battery temperature T is equal to or lower than the reference temperature Ta. If the battery temperature T is equal to or lower than the reference temperature Ta, then control proceeds to step S103, during which the additional charging and discharging electric power output section 52 determines whether or not the SOC of the storage battery 20 falls within the reference range. If the SOC of the storage battery 20 falls within the reference range, then control proceeds to step S104, during which the proportionality coefficient calculator 60 calculates the proportionality coefficient K based on the difference $\Delta T$ between the battery temperature T and the target temperature Tb.

A process of calculating the proportionality coefficient K will be described below with reference to FIGS. 9 and 10.

Figure 9:
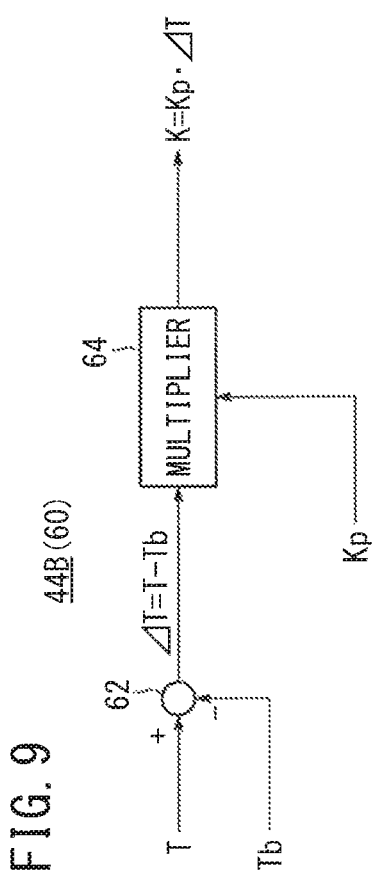
FIG. 9 is a block diagram showing a scheme (proportional control) in which the second higher-level controller calculates a proportionality coefficient.

As shown in FIG. 9, according to a proportional control scheme, a subtractor 62 calculates the difference $\Delta T$ (=T−Tb) between the battery temperature T and the target temperature Tb, and a multiplier 64 multiplies the difference $\Delta T$ by a reference proportionality coefficient Kp, thereby producing a present proportionality coefficient K. The reference proportionality coefficient Kp is preset based on simulations, experiments, or the like, and is stored together with information representing the reference temperature Ta and the target temperature Tb in a memory (not shown) of the second higher-level controller 44B. When the proportionality coefficient K is calculated, the target temperature Tb and the reference proportionality coefficient Kp are read from the memory, and as described above, the battery temperature T is supplied from the battery controller 32 to the second higher-level controller 44B. According to one example of numerical values, if the battery temperature T is 295° C. and the target temperature Tb is 300° C., then the difference ΔT between the battery temperature T and the target temperature Tb is calculated as 295−300=−5° C. If the reference proportionality coefficient Kp is +4, for example, then the proportionality coefficient K is calculated as −5×(+4)=−20 MW/Hz.

Figure 10:
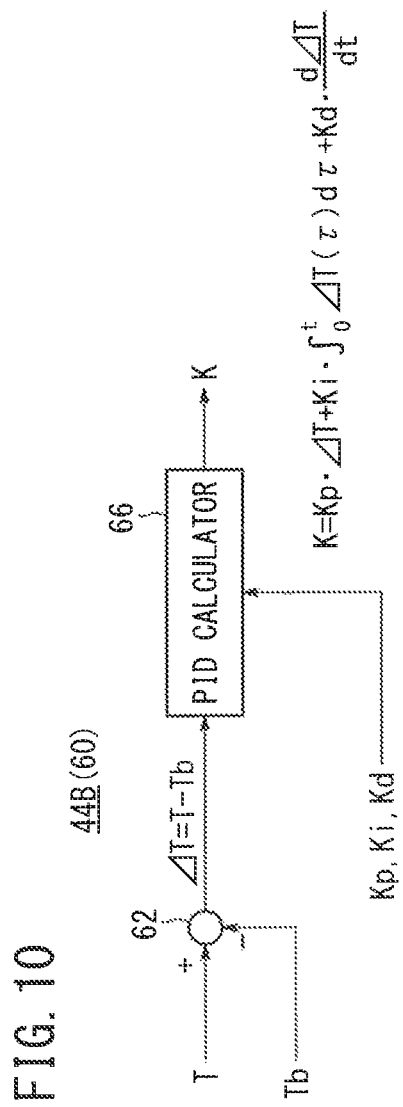
FIG. 10 is a block diagram showing a scheme (PID control) in which the second higher-level controller calculates a proportionality coefficient.

According to a PID control scheme, as shown in FIG. 10, a subtractor 62 calculates the difference ΔT between the battery temperature T and the target temperature Tb, and a PID calculator 66 multiplies the difference ΔT by a first reference proportionality coefficient Kp, multiplies an integral of the difference ΔT by a second reference proportionality coefficient Ki, multiplies a derivative of the difference ΔT by a third reference proportionality coefficient Kd, and adds the calculated products to produce a present proportionality coefficient K. The first reference proportionality coefficient Kp, the second reference proportionality coefficient Ki, and the third reference proportionality coefficient Kd are preset based on simulations, experiments, or the like, and are stored together with information representing the reference temperature Ta and the target temperature Tb in a memory (not shown) of the second higher-level controller 44B.

If the additional charging and discharging electric power output section 52 determines that the battery temperature T is higher than the reference temperature Ta in step S102 in FIG. 8, or if the additional charging and discharging electric power output section 52 determines that the SOC of the storage battery 20 does not fall within the reference range in step S103, then control proceeds to step S105, during which the proportionality coefficient calculator 60 sets the proportionality coefficient K to 0 MW/Hz.

After step S104 or step S105, control proceeds to step S106, during which the proportionality coefficient calculator 60 updates the proportionality coefficient K to a present proportionality coefficient, which is to be used by the additional charging and discharging electric power output section 52 in order to calculate an additional charging and discharging electric power value (the proportionality coefficient calculated in step S104 or step S105).

After step S106, or if the period that has elapsed from the previous proportionality coefficient updating time has not reached the proportionality coefficient updating period in step S101, control proceeds to step S107, during which the additional charging and discharging electric power output section 52 calculates an additional charging and discharging electric power value based on the proportionality coefficient K and the difference Δf (=f−fa) between the system frequency f and the reference frequency fa. Thereafter, in step S108, the charging and discharging command output section 54 calculates a command charging and discharging electric power value D from the basic charging and discharging electric power value and the additional charging and discharging electric power value, and then outputs the command charging and discharging electric power value D to the PCS 42.

A process of calculating the basic charging and discharging electric power value and the additional charging and discharging electric power value will be described below with reference to FIG. 11. Variables Pa, P1, etc., shown in parentheses in FIG. 11 will be used with respect to a process, which is carried out by the fifth higher-level controller 44E, to be described later, of calculating the basic charging and discharging electric power value and the additional charging and discharging electric power value.

Figure 11:
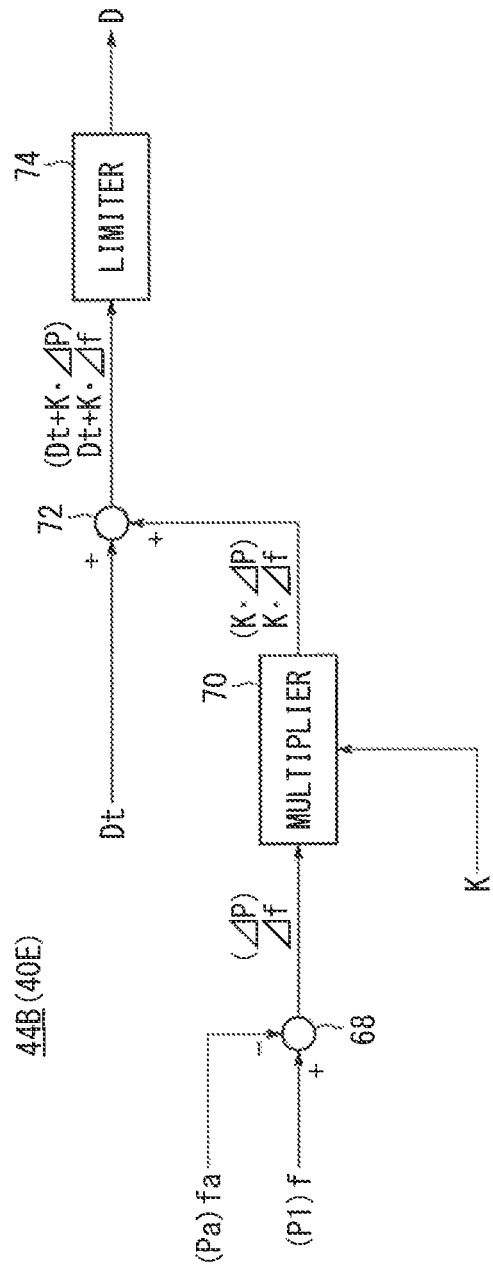
FIG. 11 is a block diagram showing a scheme in which the second higher-level controller (fifth higher-level controller) calculates a charging and discharging command value.

As shown in FIG. 11, a subtractor 68 calculates the difference Δf between the system frequency f and the reference frequency fa, and a multiplier 70 multiplies the difference Δf by the proportionality coefficient K calculated by the proportionality coefficient calculator 60, thereby producing an additional charging and discharging electric power value K·Δf. Then, an adder 72 adds the additional charging and discharging electric power value K·Δf to a basic charging and discharging electric power value Dt, thereby producing the command charging and discharging electric power value D. The system frequency f is supplied from the frequency meter 48, which is combined with the bus bar 14, and the reference frequency fa is read from the memory. According to one example of numerical values, if the difference Δf between the system frequency f and the reference frequency fa is −0.1 Hz (providing that the system frequency f<the reference frequency fa), the basic charging and discharging electric power value Dt is 0, and the proportionality coefficient K is −20 MW/Hz, then the additional charging and discharging electric power value K·Δf is calculated as −0.1 Hz×−20 MW/Hz, and the command charging and discharging electric power value D is calculated as 0+(−0.1 Hz×−20 MW/Hz)=+2 MW. A limiter 74 is connected at a stage following the adder 72. The limiter 74 serves to limit the command charging and discharging electric power value D generated by the adder 72, so that the value thereof will not exceed an allowable maximum output electric power value of the storage battery 20. For example, if the allowable maximum output electric power value of the storage battery 20 is ±1 MW and the command charging and discharging electric power value D generated by the adder 72 is +2 MW, then the limiter 74 limits the command charging and discharging electric power value D to +1 MW. The command charging and discharging electric power value D output from the limiter 74 is output to the PCS 42 as the command charging and discharging electric power value D.

If the proportionality coefficient K remains set at 0 through step S105 in FIG. 8, the charging and discharging command output section 54 outputs the basic charging and discharging electric power value Dt to the PCS 42 as the command charging and discharging electric power value D.

In step S109, the second higher-level controller 44B determines whether or not there is a system termination request. If a system termination request is not present, then control returns to step S101 and steps S101 through S109 are repeated. If there is a system termination request, then the processing sequence of the second higher-level controller 44B is brought to an end.

The proportionality coefficient updating period described above is defined as a period after the proportionality coefficient K has been updated and until the proportionality coefficient K is updated next, which is set to a value ranging from 1 minute to 1 hour, for example. During the proportionality coefficient updating period, the proportionality coefficient K remains constant. However, the difference Δf varies, so that the additional charging and discharging electric power value varies. The period after one command charging and discharging electric power value has been output until a next command charging and discharging electric power value is output is set to a value ranging from 1 to 4 seconds, for example.

Figure 12:
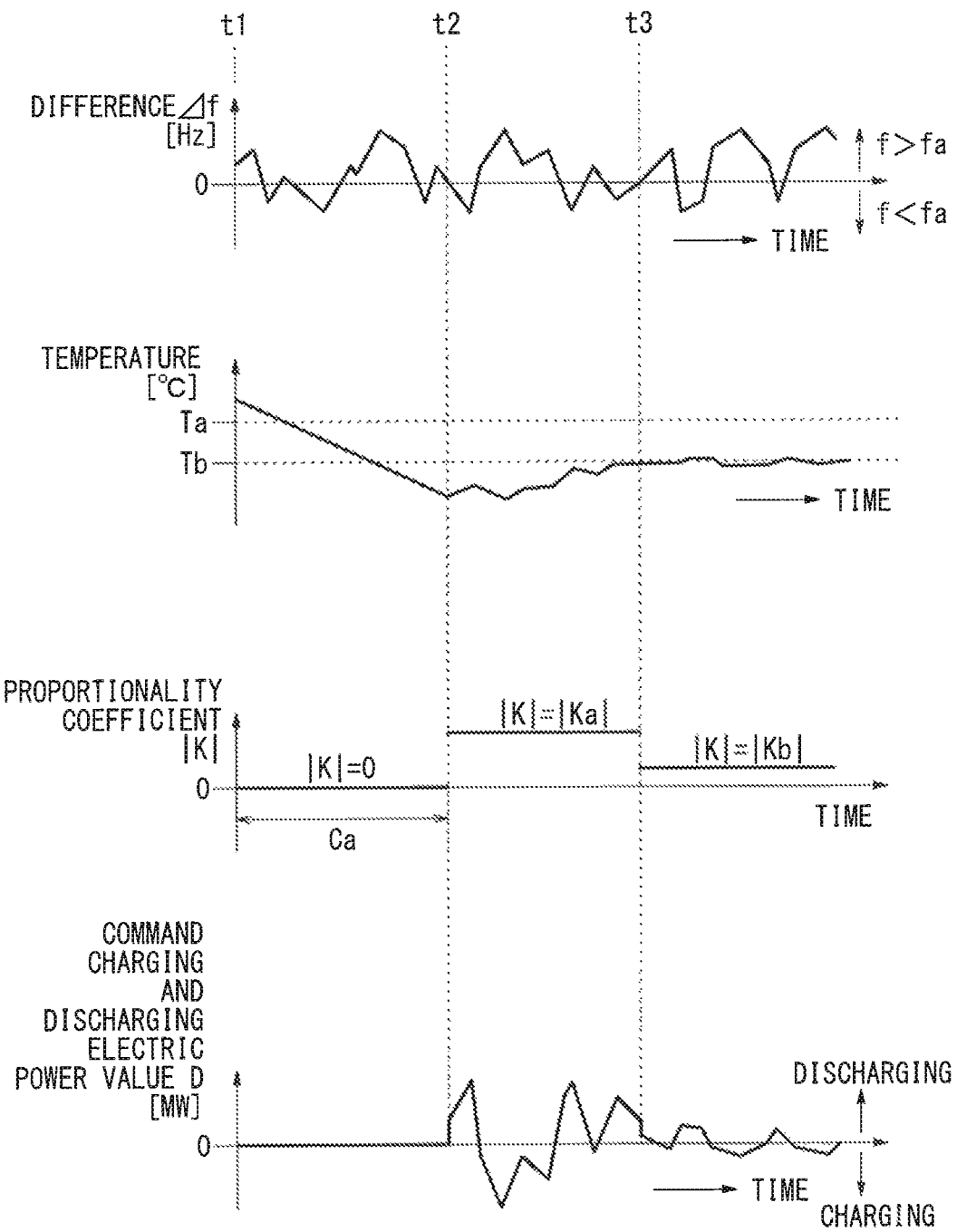
FIG. 12 is a diagram showing transitions of a frequency difference, a temperature difference, a proportionality coefficient (absolute value), and a command charging and discharging electric power value in the processing sequence of the second higher-level controller.

As shown in FIG. 12, with the second higher-level controller 44B, for example, the battery temperature T is higher than the reference temperature Ta at the proportionality coefficient updating time t1. Therefore, the proportionality coefficient K is set to 0, and the additional charging and discharging electric power value is set to 0 MW. If the reference charging and discharging electric power value is 0, then since the command charging and discharging electric power value also is 0, the storage battery 20 is not charged and discharged, and the battery temperature T decreases. At the next proportionality coefficient updating time t2, upon elapse of a proportionality coefficient updating period Ca, the battery temperature T is lower than the reference temperature Ta. Therefore, the proportionality coefficient K is set to a value Ka depending on the difference ΔT between the battery temperature T and the target temperature Tb at the proportionality coefficient updating time t2, and the additional charging and discharging electric power value is set to a value that depends on the proportionality coefficient Ka and the difference Δf, and is added to the basic charging and discharging electric power value Dt, the sum thereof being sequentially output as the command charging and discharging electric power value D. The PCS 42 charges and discharges the storage battery 20 according to the command charging and discharging electric power value D, which is sequentially supplied to the PCS 42. More specifically, when the system frequency f<the reference frequency fa (i.e., the difference Δf<0 Hz), the storage battery 20 is discharged in order to supply DC electric power. The DC electric power is converted by the DC-to-AC converter 46 into AC electric power, which is supplied to the main line 16 through the third transformer 26c and the third circuit breaker 24c. When the system frequency f>the reference frequency fa (i.e., the difference Δf>0 Hz), the storage battery 20 is charged with DC electric power, which is converted by the DC-to-AC converter 46 from AC electric power that is supplied from the main line 16 through the third circuit breaker 24c and the third transformer 26c.

Since the proportionality coefficient K is set to the value Ka, which is not 0, the storage battery 20 is charged and discharged with the additional charging and discharging electric power in addition to the basic charging and discharging electric power. Consequently, the storage battery 20 is supplied with additional thermal energy, which is greater than if the proportionality coefficient K were set to 0

At the next proportionality coefficient updating time t3, the battery temperature T is lower than the reference temperature Ta. Therefore, the proportionality coefficient K is set to a value Kb depending on the difference ΔT between the battery temperature T and the target temperature Tb, and the command charging and discharging electric power value D is set to a value that depends on the proportionality coefficient Kb and the difference Δf, and is sequentially output. Since the difference ΔT is of a value that is smaller than the difference ΔT at time t2, the proportionality coefficient Kb also is changed to a value smaller than the proportionality coefficient Ka. Consequently, the command charging and discharging electric power value D also becomes of a correspondingly smaller value.

According to the second embodiment, as shown in FIG. 13, when the temperature T of the storage battery 20 becomes lower than the reference temperature Ta, the storage battery 20 is charged and discharged in repeated charging and discharging cycles, each having a continuous charging time and a continuous discharging time and each ranging from about several seconds to 1 hour, and the storage battery 20 outputs an amount of electric power depending on the charging and discharging cycles. Therefore, the storage battery 20 is supplied with thermal energy so that the temperature T thereof is kept in the vicinity of the target temperature Tb (target temperature Tb ±5 CC). Consequently, the heaters 38 of the storage battery 20 are not supplied with electric power (heater electric power) except when the storage battery 20 is activated, and hence the system efficiency of the electric power system 12 is increased. Further, since each of the continuous charging time and the continuous discharging time is short, ranging from several seconds to 1 hour, the SOC can be maintained substantially constant (e.g., in the vicinity of 80%).

In the series of charging and discharging cycles, the charging and discharging electric power from the storage battery 20 is proportional to the difference Δf between the system frequency f and the reference frequency fa. Since the charging and discharging electric power is supplied through the third circuit breaker 24c to the main line 16, the charging and discharging electric power is used as electric power for mitigating variations in the system frequency f on the bus bar 14. Stated otherwise, the charging and discharging electric power contributes to stabilization of the system frequency f. Furthermore, inasmuch as the charging and discharging electric power (output electric power) from the storage battery 20 depends on the proportionality coefficient K, which is based on the difference ΔT between the battery temperature T and the target temperature Tb (i.e., the proportionality coefficient is set according to a proportional control scheme or a PID control scheme), the battery temperature T of the storage battery 20 can converge efficiently to the target temperature Tb.

In the present embodiment, the system frequency f is obtained based on frequency information from the frequency meter 48 combined with the bus bar 14. Alternatively, the system frequency f may be acquired from an electric power company or a system administrator, or the difference Δf between the system frequency f and the reference frequency fa may be acquired.

In the present embodiment described above, the additional application has been described as an application for frequency adjustment. However, alternatively, if the additional application is an application for adjusting electric power supplies with respect to electric power demands, then the additional charging and discharging electric power output section 52 may calculate the additional charging and discharging electric power value based on the proportionality coefficient K and a difference between the generated electric power from the electric power system and a demanded electric power, and then output the calculated additional charging and discharging electric power value to the charging and discharging command output section 54.

Figure 14:
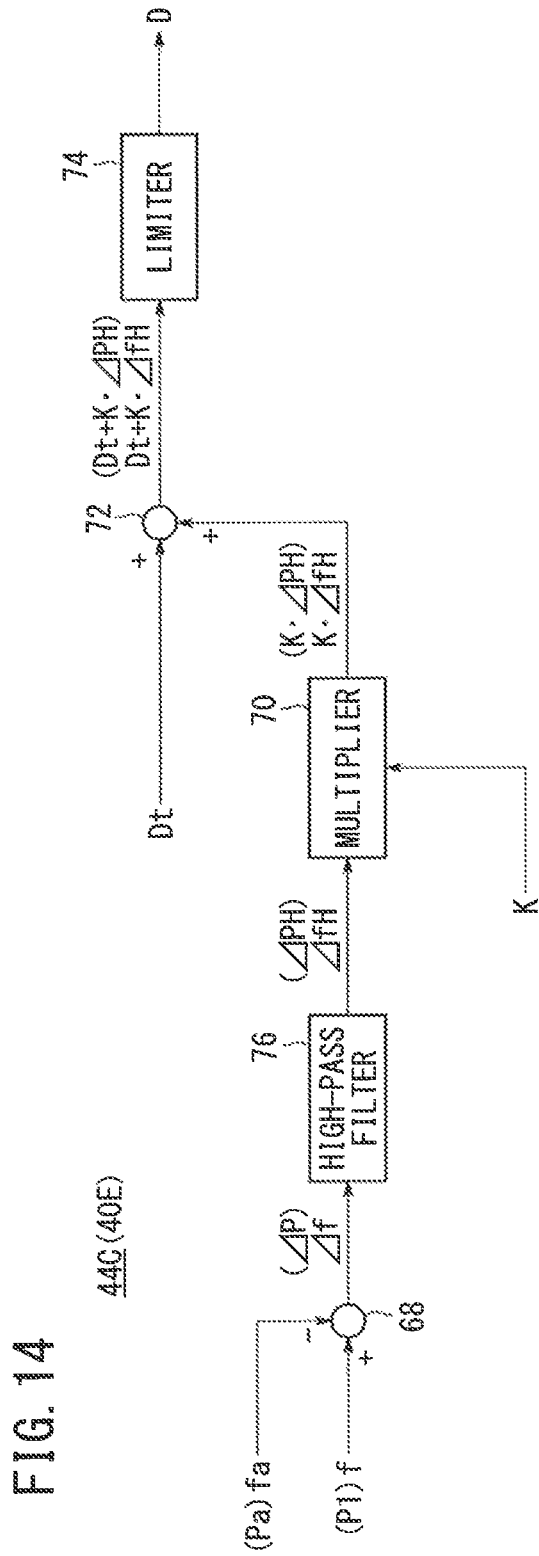
FIG. 14 is a block diagram showing an example (using a high-pass filter) of a scheme in which the third higher-level controller (fifth higher-level controller) calculates a charging and discharging command value.

A higher-level controller according to a third embodiment of the present invention (hereinafter referred to as a "third higher-level controller 44C") is essentially of the same configuration as the second higher-level controller 44B, but as shown in FIG. 14, differs therefrom with respect to a portion of the process for calculating the command charging and discharging electric power value D. Variables Pa, P1, etc., shown in parentheses in FIG. 14, will be used with respect to a process, which is carried out by a later-described sixth higher-level controller, of calculating the command charging and discharging electric power value.

More specifically, the third higher-level controller 44C according to the third embodiment differs from the second higher-level controller 44B in that a subtractor 65 is used for calculating the difference Δf between the system frequency f and the reference frequency fa, and a high-pass filter 76 is used for extracting a change in a high-frequency component from time-dependent changes in the difference Δf. The high-pass filter 76 then supplies the extracted changes to a multiplier 70 at a subsequent stage. The high-pass filter 76 generates an output signal ΔfH, the absolute value of which is greater when changes in the difference Δf are larger, and smaller when changes in the difference Δf are smaller.

Figure 15:
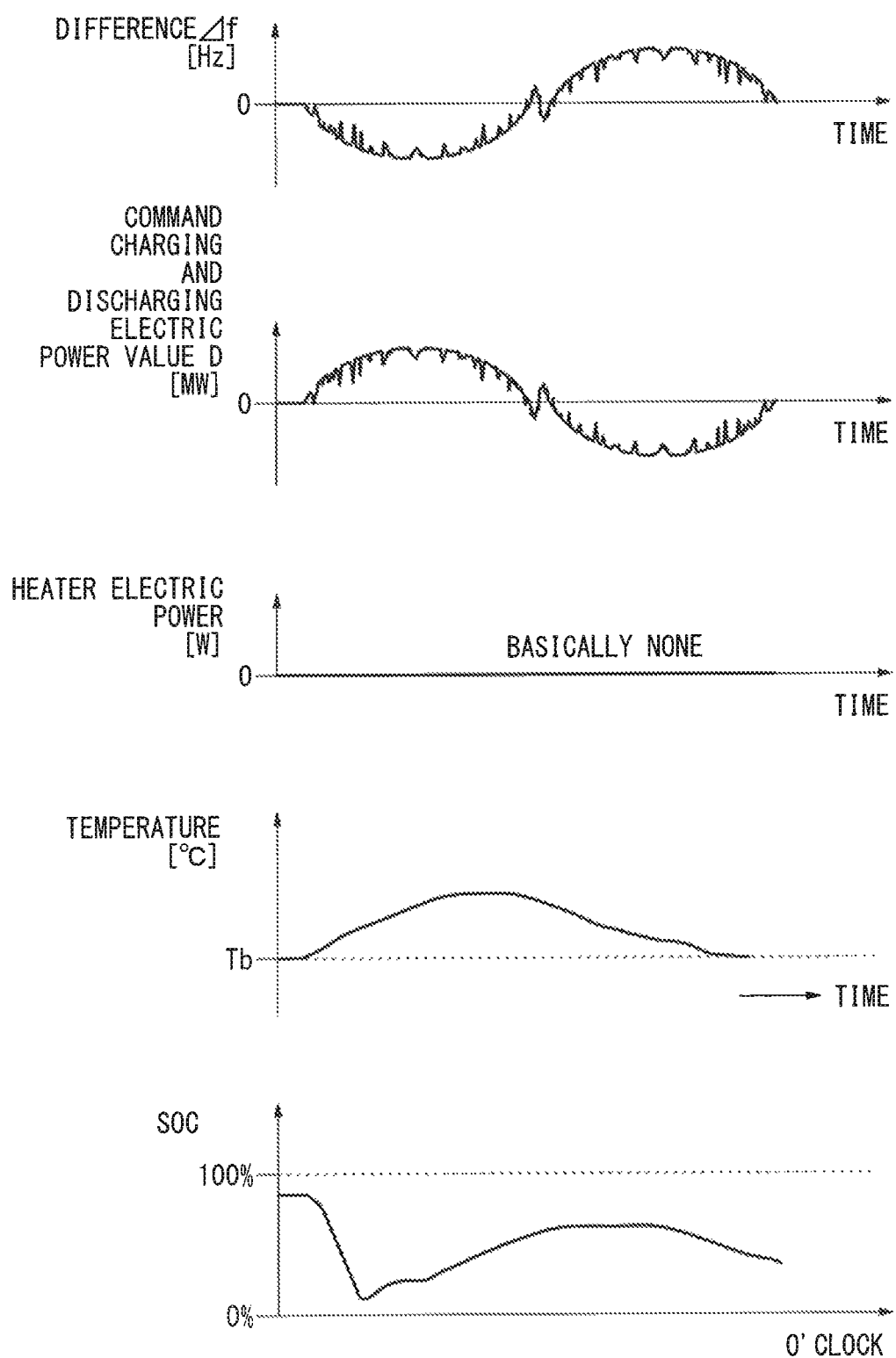
FIG. 15 is a diagram showing transitions of a difference $\Delta f$, a command charging and discharging electric power value, heater electric power, the temperature of the storage battery, and the SOC of the storage battery when time-dependent changes of the difference $\Delta f$ include low-frequency components and high-frequency components.
Figure 16:
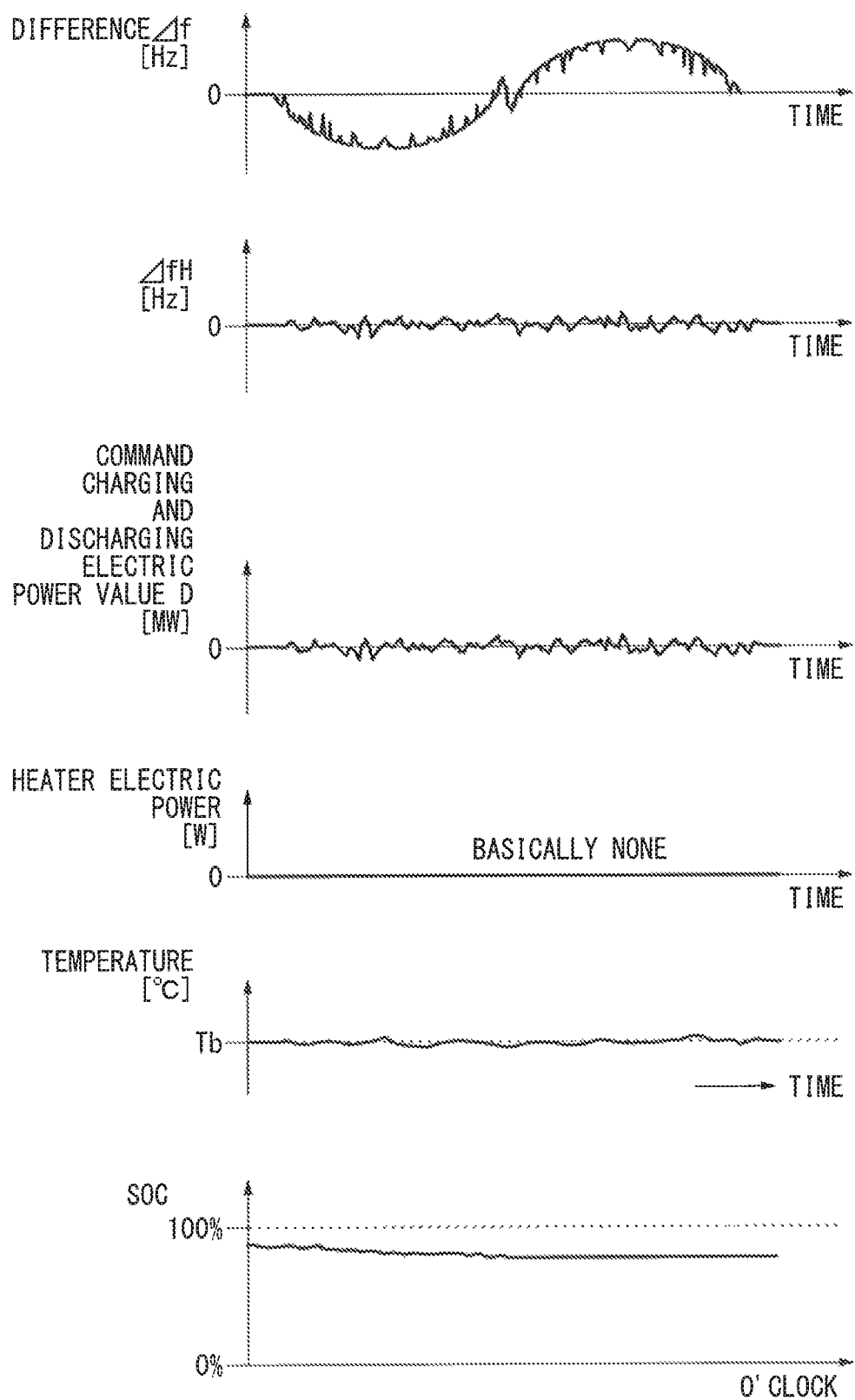
FIG. 16 is a diagram showing transitions of an extracted high-frequency-component difference $\Delta fH$, a command charging and discharging electric power value, heater electric power, the temperature of the storage battery, and the SOC of the storage battery when time-dependent changes of the difference $\Delta f$ include low-frequency components and high-frequency components.

For example, as shown in FIG. 15, time-dependent changes in the difference Δf include a low-frequency component ΔfL and a high-frequency component ΔfH. The low-frequency component ΔfL remains positive or negative over a prolonged period, which is at least one half of one proportionality coefficient updating period Ca. Therefore, if a command charging and discharging electric power value D is calculated based on the difference Δf, the storage battery 20 is continuously charged or discharged only over the prolonged period, and hence the SOC thereof tends to vary significantly. On the other hand, the high-frequency component ΔfH tends to undergo a positive-to-negative shift or a negative-to-positive shift within a short period. As shown in FIG. 16, the high-pass filter 76 extracts only the high-frequency component ΔfH, and the third higher-level controller 44C calculates a command charging and discharging electric power value D based on the high-frequency component ΔfH. Thus, the storage battery 20 is alternately charged and discharged in short periods, and the SOC thereof prevented from varying. A difference other than the high-frequency component ΔfH, i.e., the low-frequency component ΔfL, is not extracted by the high-pass filter 76. The high-pass filter 76 preferably has a cut-off frequency of 1/3600 Hz, for example, for mitigating variations in the SOC.

According to the third embodiment, only discharging electric power (positive electric power) and charging electric power (negative electric power), which are based on the high-frequency component ΔfH, are supplied to the main line 16 through the DC-to-AC converter 46, the third transformer 26c, and the third circuit breaker 24c for thereby contributing to stabilization of the system frequency f.

A higher-level controller according to a fourth embodiment of the present invention (hereinafter referred to as a "fourth higher-level controller 44D") is essentially of the same configuration as the second higher-level controller 44B (see FIG. 7), but differs therefrom in that an upper-limit temperature Tmax1 and a proportionality coefficient Km (where Km is a value of 1 or greater) are used.

A processing sequence of the fourth higher-level controller 44D will be described below with reference to the flowchart shown in FIG. 17.

Figure 17:
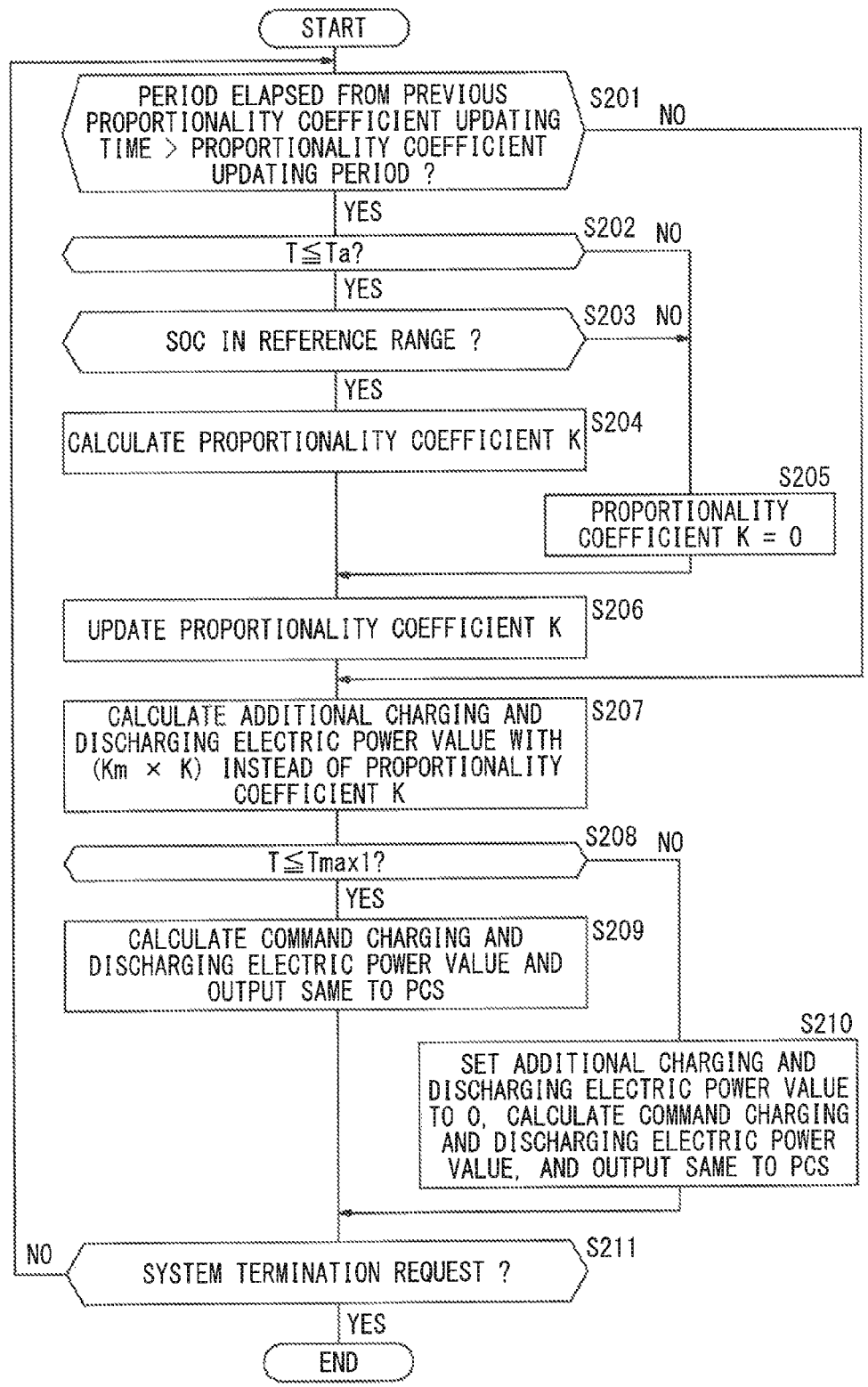
FIG. 17 is a flowchart of a processing sequence of a fourth higher-level controller.

As shown in FIG. 17, the processing sequence in steps S201 through S206 is the same as the processing sequence (steps S101 through S106 shown in FIG. 8) of the above-described second higher-level controller 44B, and will not be described in detail below.

After step S206, or if the period that has elapsed from the previous proportionality coefficient updating time has not reached the proportionality coefficient updating period in step S201, control proceeds to step S207, during which the additional charging and discharging electric power output section 52 calculates an additional charging and discharging electric power value. As described above, with the second higher-level controller 44B, as shown in FIG. 11, the proportionality coefficient K is multiplied by the difference Δf, to thereby calculate an additional charging and discharging electric power value. However, with the fourth higher-level controller 44D, instead of the proportionality coefficient K, a proportionality coefficient (Km×K), is multiplied by the difference Δf, to thereby calculate an additional charging and discharging electric power value.

Thereafter, in step S208, the charging and discharging command output section 54 determines whether or not the battery temperature T is equal to or lower than the upper-limit temperature Tmax1. If the battery temperature T is equal to or lower than the upper-limit temperature Tmax1, then control proceeds to step S209, during which the charging and discharging command output section 54 calculates a command charging and discharging electric power value D from the basic charging and discharging electric power value and the additional charging and discharging electric power value, and then outputs the command charging and discharging electric power value D to the PCS 42. If the battery temperature T is determined to be higher than the upper-limit temperature Tmax1, then control proceeds to step S210, during which the charging and discharging command output section 54 sets the additional charging and discharging electric power value to 0, calculates a command charging and discharging electric power value D, and then outputs the calculated charging and discharging electric power value D to the PCS 42.

After step S209 or step S210, control proceeds to step S211, during which the fourth higher-level controller 44D determines whether or not there is a system termination request. If a system termination request is not present, then control returns to step S201 and steps S201 through S211 are repeated. If there is a system termination request, then the processing sequence of the fourth higher-level controller 44D is brought to an end.

Since the fourth higher-level controller 44O uses the proportionality coefficient (Km×K) instead of the proportionality coefficient K, as shown in FIG. 18, the additional charging and discharging electric power value is greater than the case of the second higher-level controller 44B, and hence the command charging and discharging electric power value D is significantly greater, resulting in a higher rate at which the temperature of the storage battery 20 rises. The processing sequence in steps S208 through S210 is performed in order to add additional charging and discharging electric power other than 0, intermittently rather than continuously, thereby keeping the storage battery 20 at a temperature that is suitable for charging and discharging, i.e., a temperature close to the target temperature Tb.

Normally, the difference Δf between the system frequency f and the reference frequency fa becomes greater within a time zone of larger load variations, and within a tinge zone during which the capacity of an electric generator, which is capable of changing the generated electric power for frequency adjustment, is smaller. Further, the difference Δf between the system frequency f and the reference frequency fa becomes smaller within a time zone of smaller load variations, and within a time zone during which the capacity of an electric generator, which is capable of changing the generated electric power for frequency adjustment, is larger.

Since the fourth higher-level controller 44D is capable of intermittently adding additional charging and discharging electric power, the fourth higher-level controller 44D can contribute effectively to stabilization of the system frequency f, and can keep the storage battery 20 at a temperature that is suitable for charging and discharging, by making the additional charging and discharging electric power value greater within time zones during which the difference Δf between the system frequency f and the reference frequency fa is large.

The difference between generated electric power and planned electric power of a natural-energy-based electric generating apparatus becomes larger for solar power generation within a time zone during which the difference between a predicted amount of solar radiation and an actual amount of solar radiation is larger, and for wind farm power generation within a time zone during which a predicted value of wind power and an actual value of wind power is larger. Further, the difference becomes smaller for solar power generation within a time zone during which the difference between a predicted amount of solar radiation and an actual amount of solar radiation is smaller, and for wind farm power generation within a time zone during which a predicted value of wind power and an actual value of wind power is smaller.

Since the fourth higher-level controller 44D is capable of intermittently adding additional charging and discharging electric power, the fourth higher-level controller 44D can contribute effectively to stabilization of the system frequency f, and can keep the storage battery 20 at a temperature that is suitable for charging and discharging, by making the additional charging and discharging electric power value greater within time zones during which the difference between generated electric power and planned electric power of natural-energy-based electric generating apparatus is larger.

Figure 19:
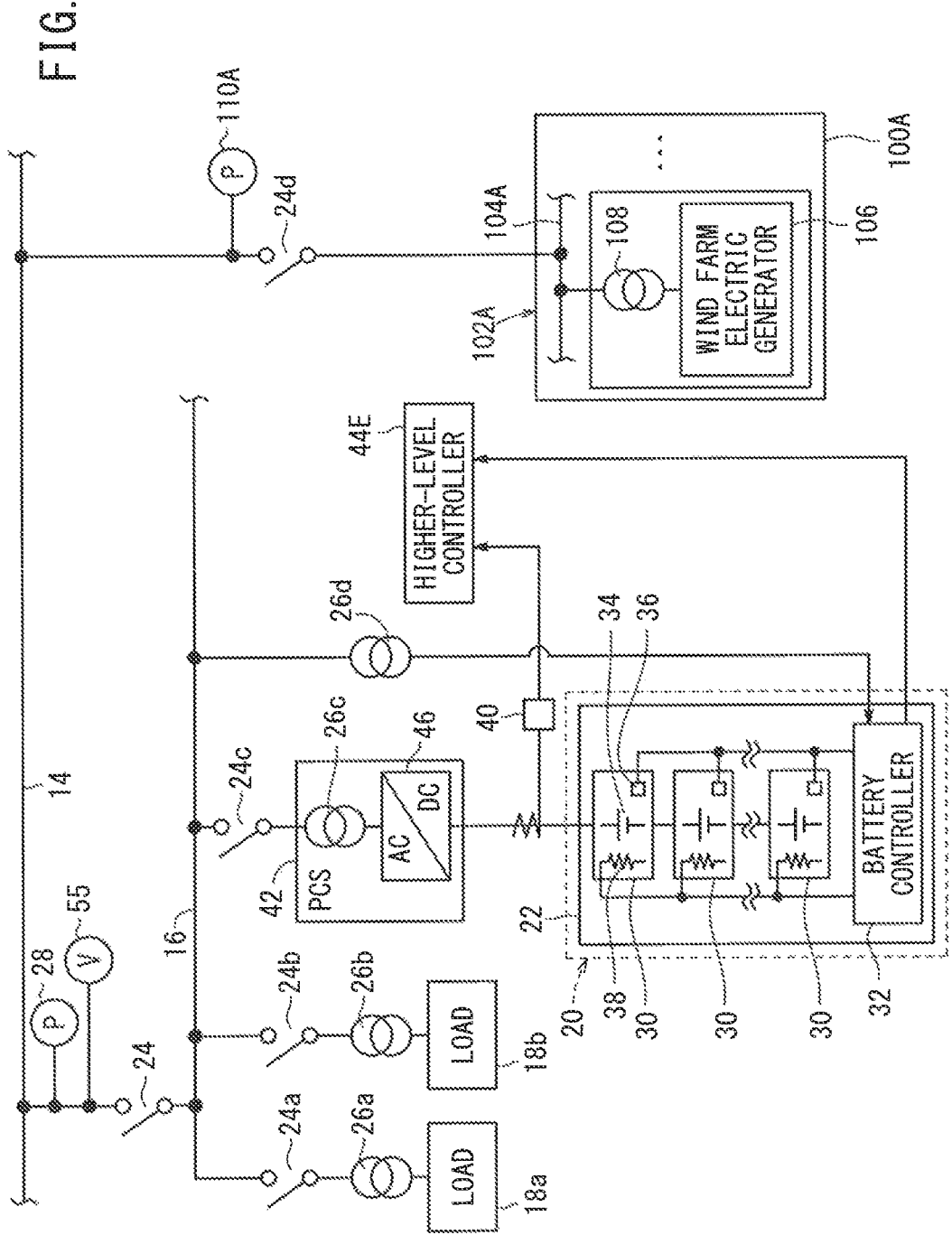
FIG. 19 is a block diagram of an electric power system incorporating a fifth higher-level controller according to an embodiment of the present invention.

As shown in FIG. 19, the electric power system 12, which incorporates therein the electric power control system 10, may include a first linkage electric power generating system 102A to which a plurality of natural-energy-based electric generating systems (e.g., wind farm power generation systems, hereinafter referred to as "first electric power generation systems 100A") are connected. The first linkage electric power generating system 102A is connected to the bus bar 14 through a fourth circuit breaker 24d.

Each of the first electric power generation systems 100A is connected to a first branch line 104A through a circuit breaker (not shown), and includes a wind farm electric generator 106 and a transformer 108. The first branch line 104A is connected to the main line 16 through the fourth circuit breaker 24d. Output electric power (generated electric power) from the first linkage electric power generating system 102A is supplied to the bus bar 14 through the fourth circuit breaker 24d. The first linkage electric power generating system 102A has an output terminal connected to a first electric power sensor 110A, which measures the output electric power P1 from the first linkage electric power generating system 102A.

A higher-level controller according to a fifth embodiment of the present invention (hereinafter referred to as a "fifth higher-level controller 44E") is applied to the electric power system 12, which includes the first linkage electric power generating system 102A. Basic applications of the fifth embodiment include, for example, an application as an electric power source for use in the event of a power outage, as well as an application for load leveling. Additional applications of the fifth embodiment include an application for natural energy smoothing for used in wind farm power generation, for example. Electric power for mitigating variations in output power P1 from the first linkage electric power generating system 102A is used as additional charging and discharging electric power, in order to supply thermal energy to the storage battery 20 for keeping the storage battery 20 at a temperature in the vicinity of the target temperature Tb (target temperature Tb ±5° C.).

Figure 20:
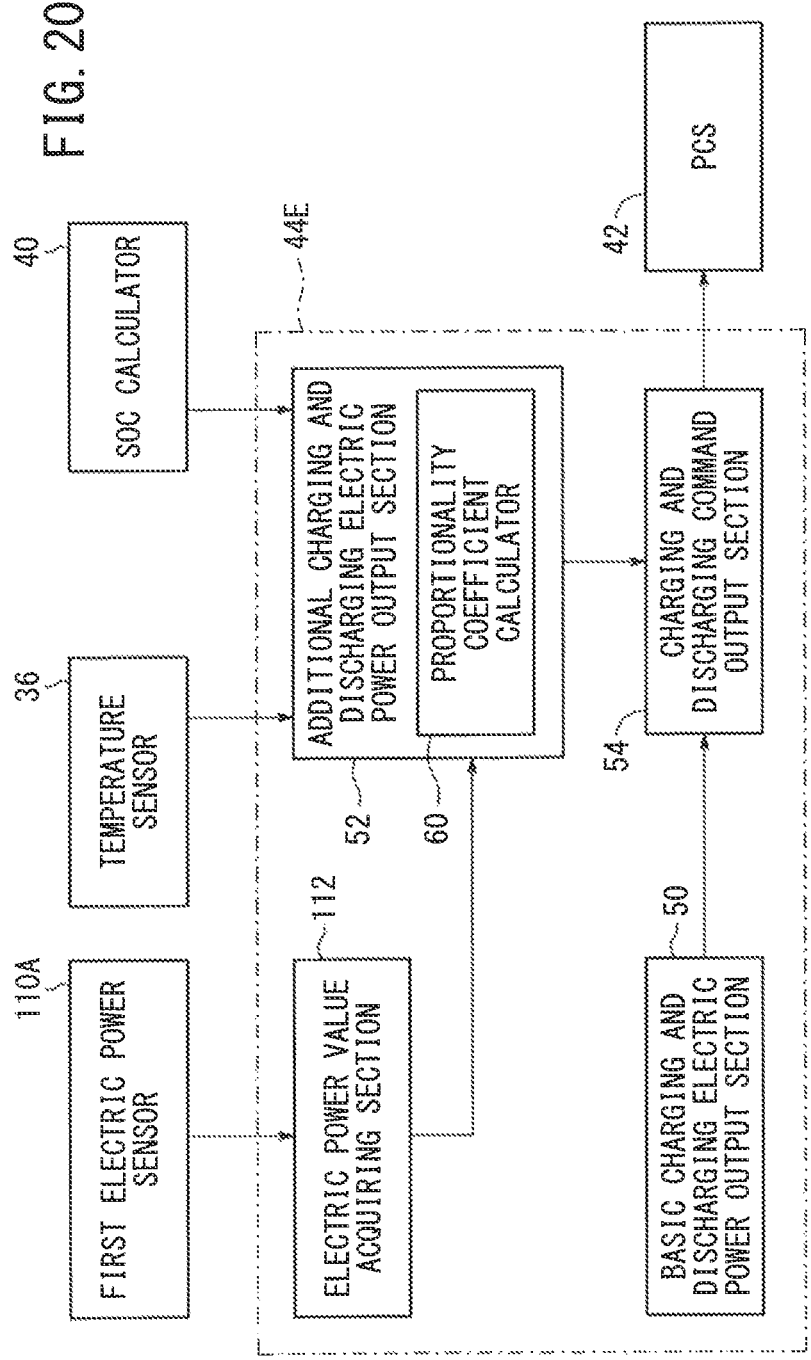
FIG. 20 is a block diagram of the fifth higher-level controller.

More specifically, the fifth higher-level controller 44E is essentially of the same configuration as the second higher-level controller 44B. As shown in FIG. 20, the fifth higher-level controller 44E includes the basic charging and discharging electric power output section 50, the additional charging and discharging electric power output section 52, and the charging and discharging command output section 54, which have been described above, as well as an electric power value acquiring section 112 for acquiring the electric power value P1 of the first linkage electric power generating system 102A through the first electric power sensor 110A.

A processing sequence of the fifth higher-level controller 44E will be described below with reference to the flowchart shown in FIG. 8.

In step S101 shown in FIG. 8, the additional charging and discharging electric power output section 52 determines whether or not the period that has elapsed from the previous time at which the proportionality coefficient was updated (previous proportionality coefficient updating time) has reached a preset period for updating the proportionality coefficient (proportionality coefficient updating period). If control passes through step S101 for the first time after the fifth higher-level controller 44E has been activated, or if the period that has elapsed from the previous proportionality coefficient updating time has reached the proportionality coefficient updating period, then control proceeds to step S102, during which the additional charging and discharging electric power output section 52 determines whether or not the battery temperature T is equal to or lower than the reference temperature Ta. If the battery temperature T is equal to or lower than the reference temperature Ta, then control proceeds to step S103, during which the additional charging and discharging electric power output section 52 determines whether or not the SOC of the storage battery 20 falls within the reference range. If the SOC of the storage battery 20 falls within the reference range, then control proceeds to step S104, during which the proportionality coefficient calculator 60 calculates the proportionality coefficient K based on the difference ΔT between the battery temperature T and the target temperature Tb. The process of calculating the proportionality coefficient K has been described above (see FIGS. 9 and 10), and will not be described below.

If the additional charging and discharging electric power output section 52 determines that the battery temperature T is higher than the reference temperature Ta in step S102, or if the additional charging and discharging electric power output section 52 determines that the SOC of the storage battery 20 does not fall within the reference range in step S103, then control proceeds to step S105, during which the proportionality coefficient calculator 60 sets the proportionality coefficient K to 0 MW/Hz.

After step S104 or step S105, control proceeds to step S106, during which the proportionality coefficient calculator 60 updates the proportionality coefficient K, which is used by the additional charging and discharging electric power output section 52 to calculate the additional charging and discharging electric power value, to a present proportionality coefficient (i.e., the proportionality coefficient calculated in step S104 or step S105).

After step S106, or if the period that has elapsed from the previous proportionality coefficient updating time has not reached the proportionality coefficient updating period in step S101, control returns to step S107, during which the additional charging and discharging electric power output section 52 calculates an additional charging and discharging electric power value based on the proportionality coefficient K and the difference ΔP (differential signal) between an output electric power value P1 and a planned output electric power value Pa of the first linkage electric power generating system 102A. Thereafter, in step S108, the charging and discharging command output section 54 calculates a command charging and discharging electric power value D from the basic charging and discharging electric power value and the additional charging and discharging electric power value, and then outputs the command charging and discharging electric power value D to the PCS 42.

The additional charging and discharging electric power value and the command charging and discharging electric power value D are calculated in the following manner. As shown in parentheses in FIG. 11, the subtractor 68 calculates the difference ΔP between the output electric power value P1 and the planned output electric power value Pa of the first linkage electric power generating system 102A, and the multiplier 70 multiplies the difference ΔP by the proportionality coefficient K calculated by the proportionality coefficient calculator 60, thereby producing an additional charging and discharging electric power value K·ΔP. The adder 72 adds the additional charging and discharging electric power value K·ΔP to the basic charging and discharging electric power value Dt, and the sum thereof is processed by the limiter 74 into the command charging and discharging electric power value D. The command charging and discharging electric power value D is output to the PCS 42. Alternatively, as indicated in parentheses in FIG. 14, the subtractor 68 calculates the difference ΔP between the output electric power value P1 and the planned output electric power value Pa of the first linkage electric power generating system 102A, and the high-pass filter 76 extracts a high-frequency component ΔPH from the difference ΔP. The multiplier 70 multiplies the high-frequency component ΔPH by the proportionality coefficient K calculated by the proportionality coefficient calculator 60, thereby producing an additional charging and discharging electric power value K·ΔPH. The adder 72 adds the additional charging and discharging electric power value K·ΔPH to the basic charging and discharging electric power value Dt, and the sum thereof is processed by the limiter 74 into the command charging and discharging electric power value D. The command charging and discharging electric power value D is output to the PCS 42. If the proportionality coefficient K remains set to 0 through step S105 of FIG. 8, then the charging and discharging command output section 54 outputs the basic charging and discharging electric power value Dt to the PCS 42 as the command charging and discharging electric power value D. In step S109, the fifth higher-level controller 44E determines whether or not there is a system termination request. If a system termination request is not present, then control returns to step S101 and steps S101 through S109 are repeated. If there is a system termination request, the processing sequence of the fifth higher-level controller 44E is brought to an end.

Figure 21:
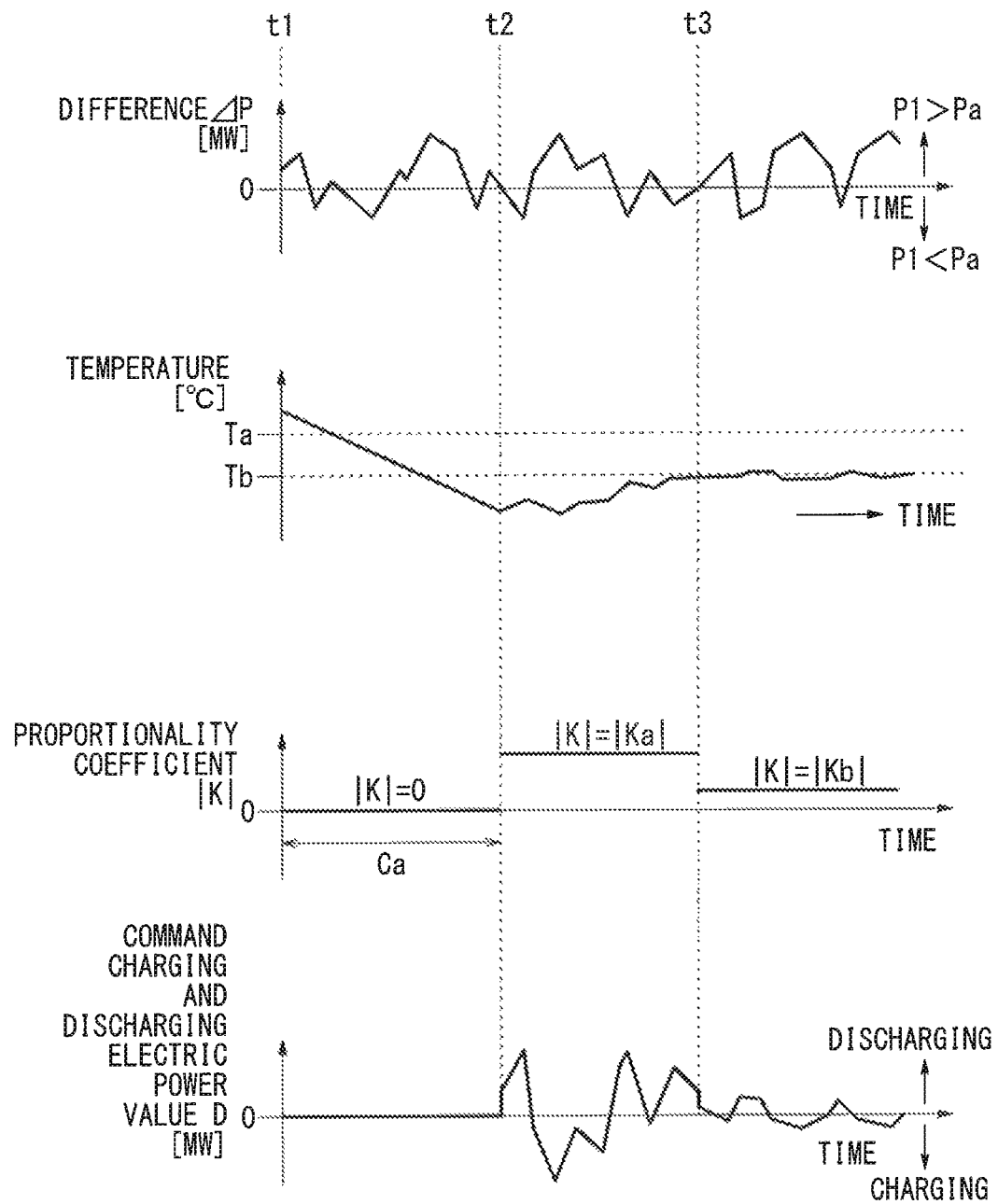
FIG. 21 is a diagram showing transitions of an electric power value difference, the temperature of a storage battery, a proportionality coefficient (absolute value), and a command charging and discharging electric power value in the processing sequence of the fifth higher-level controller.

As shown in FIG. 21, with the fifth higher-level controller 44E, for example, at one proportionality coefficient updating time t1, the battery temperature T is higher than the reference temperature Ta. Therefore, the proportionality coefficient K is set to 0, and the additional charging and discharging electric power value is set to 0 MW. If the reference charging and discharging electric power value is 0, then since the command charging and discharging electric power value also is 0, the storage battery 20 is not charged and discharged, and the battery temperature T drops. At the next proportionality coefficient updating time t2, the battery temperature T becomes lower than the reference temperature Ta. Therefore, the proportionality coefficient K is set to a value Ka that depends on the difference ΔT between the battery temperature T and the target temperature Tb at the proportionality coefficient updating time t2. The additional charging and discharging electric power value is set to a value that depends on the proportionality coefficient Ka and the difference ΔP, and is added to the basic charging and discharging electric power value Dt, the sum thereof being sequentially output as the command charging and discharging electric power value D. The PCS 42 charges and discharges the storage battery 20 according to the command charging and discharging electric power value D, which is sequentially supplied to the PCS 42. More specifically, when the output electric power P1 of the first linkage electric power generating system 102A<the planned output electric power Pa, the storage battery 20 is discharged in order to supply the DC electric power, which first is converted by the DC-to-AC converter 46 into AC electric power, and then is supplied to the main line 16. When the output electric power P1 of the first linkage electric power generating system 102A>the planned output electric power Pa, the storage battery 20 is charged with DC electric power, which is converted by the DC-to-AC converter 46 from the AC electric power that is supplied from the main line 16.

At the next proportionality coefficient updating time t3, since the battery temperature T is lower than the reference temperature Ta, the proportionality coefficient K is set to a value Kb that depends on the difference ΔT between the battery temperature T and the target temperature Tb, and the command charging and discharging electric power value D is set to a value that depends on the proportionality coefficient Kb and the difference ΔP, and the set values are sequentially output. Since the difference ΔT is of a value smaller than the difference ΔT at time t2, the proportionality coefficient Kb also is changed to a value smaller than the proportionality coefficient Ka. Consequently, the command charging and discharging electric power value D also becomes correspondingly smaller.

During a series of charging and discharging cycles, the charging and discharging electric power from the storage battery 20 is proportional to the difference ΔP between the output electric power value P1 and the planned output electric power value Pa of the first linkage electric power generating system 102A, and acts to mitigate variations in the output electric power value P1 of the first linkage electric power generating system 102A with respect to the planned output electric power value Pa. In other words, during the series of charging and discharging cycles, the charging and discharging electric power from the storage battery 20 is used as electric power to mitigate variations in the output electric power value P1 of the first linkage electric power generating system 102A, and contributes to stabilization of the output power from the first linkage electric power generating system 102A. Inasmuch as the charging and discharging electric power from the storage battery 20 also depends on the proportionality coefficient K, which is based on the difference ΔT between the battery temperature T and the target temperature Tb (i.e., a proportionality coefficient according to a proportional control scheme or a PID control scheme), the battery temperature T of the storage battery 20 can converge efficiently to the target temperature Tb.

As shown in FIG. 14, the high-pass filter 76 extracts only the high-frequency component ΔfH, and the fifth higher-level controller 44E calculates an additional charging and discharging electric power value and a command charging and discharging electric power value D based on the high-frequency component ΔfH. Thus, the storage battery 20 is alternately charged and discharged in short periods, and the SOC thereof is prevented from varying.

Since the above charging and discharging electric power in the additional application is used instead of the heater 38, the storage battery 20 is not continuously supplied with electric power (the additional charging and discharging electric power) in the additional application. However, since the charging and discharging electric power in the additional application fulfills a role (i.e., natural energy smoothing) in the additional application, thereby contributing to stabilization of the system frequency, advantages are provided, including prevention of wear and damage to the turbine of a thermal power plant in the electric power system, reductions in the total facility capacities such as electric generators and the storage battery 20 in the electric power system, and quick adjustments due to the ability to change the output power of the storage battery 20 at high speeds, etc.

Figure 22:
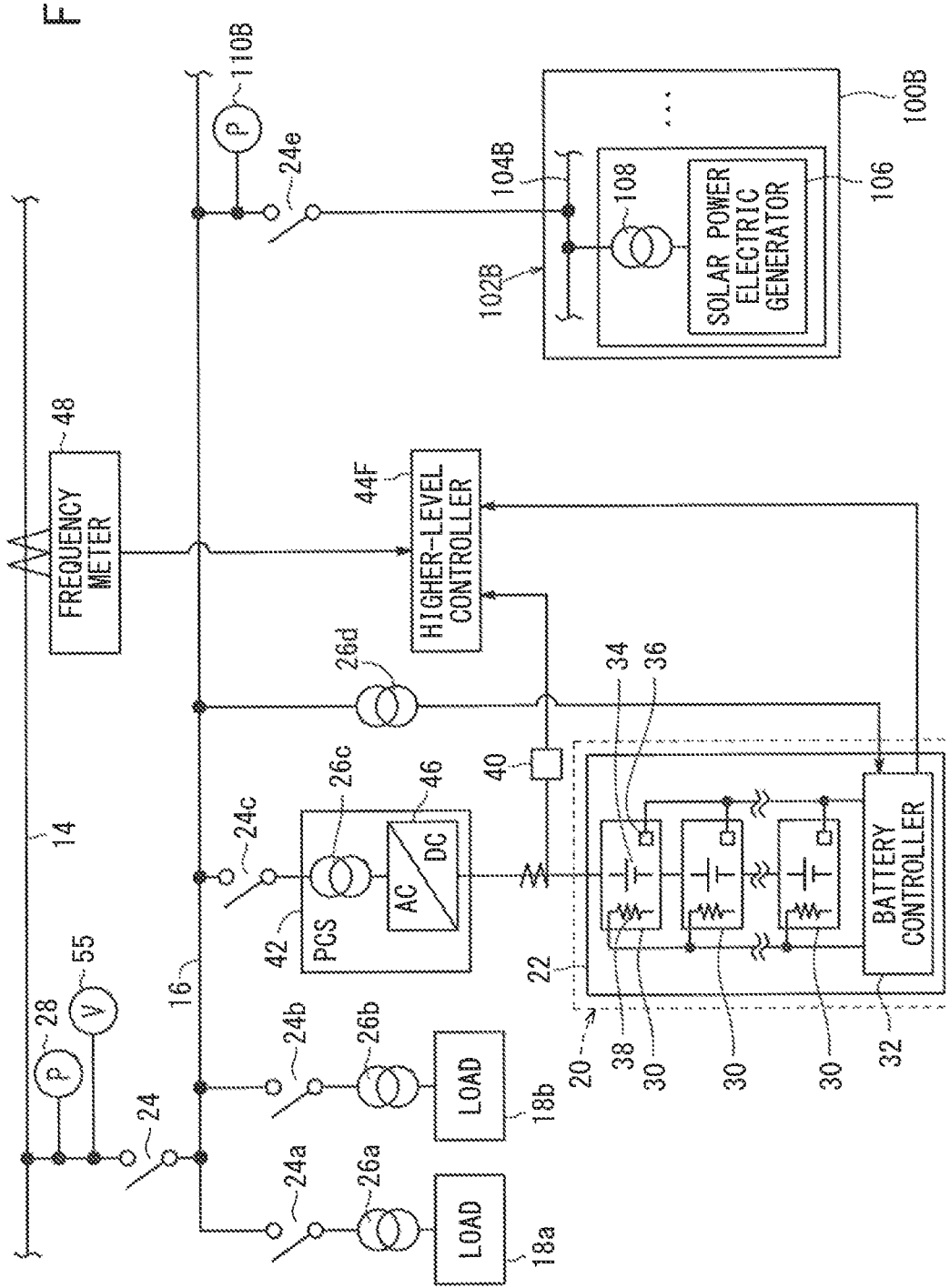
FIG. 22 is a block diagram of an electric power system incorporating a sixth higher-level controller according to an embodiment of the present invention.

As shown in FIG. 22, the electric power system 12, which incorporates therein the electric power control system 10, may include a second linkage electric power generating system 102B to which a plurality of natural-energy-based electric generating systems (e.g., solar power generation systems, hereinafter referred to as "second electric power generation systems 100B") are connected. The second linkage electric power generating system 102B is connected to the main line 16 through a fifth circuit breaker 24e. A second electric power sensor 110B, which measures the output electric power P2 from the second linkage electric power generating system 102B, is connected to the output terminal of the second linkage electric power generating system 102B. Other circuit components and connections of the electric power system 12 having the second linkage electric power generating system 102B are essentially identical to those of the electric power system 12 having the first linkage electric power generating system 102A.

The second linkage electric power generating system 102B operates within a limited time zone for generating electric power, because the second linkage electric power generating system 102B depends on solar radiation for electric power generation. For example, the second linkage electric power generating system 102B generates electric power from 8 o'clock to 16 o'clock, and generates substantially no electric power from 16 o'clock to 8 o'clock of the following day.

A higher-level controller according to a sixth embodiment of the present invention (hereinafter referred to as a "sixth higher-level controller 44F") is applied to the electric power system 12, which includes the second linkage electric power generating system 102B. Basic applications of the sixth embodiment include, for example, an application as an electric power source for natural energy smoothing, and additional applications of the sixth embodiment include an application for frequency adjustment as well as an application for adjusting electric power supplies with respect to electric power demands.

More specifically, according to the sixth embodiment, the electric power for mitigating variations in the output electric power P2 of the second linkage electric power generating system 102B is output as the basic charging and discharging electric power. If the battery temperature T is lower than the reference temperature Ta when the output electric power P2 undergoes small variations (e.g., within a time zone in which it is cloudy throughout the sky) or when the output electric power P2 is nil (e.g., at night), then the sixth higher-level controller 44F operates to minimize variations in the system frequency f, similar to the case of the second higher-level controller 44B and the third higher-level controller 44C, thereby supplying thermal energy to the storage battery 20 in order to keep the battery temperature T in the vicinity of the target temperature Tb (target temperature Tb ±5° C.).

A processing sequence of the sixth higher-level controller 44F will be described below with reference to the flowcharts shown in FIG. 8 and FIG. 23.

As the second linkage electric power generating system 102B generates electric power from 8 o'clock to 16 o'clock, for example, the basic charging and discharging electric power output section 50 outputs basic charging and discharging electric power for absorbing or mitigating variations in the electric power generated by the second linkage electric power generating system 102B. At this time, since the battery temperature T is higher than the reference temperature Ta as shown in FIG. 23, the proportionality coefficient K is set to 0 NW/Hz in step S105 of FIG. 8. Further, at this time, the additional charging and discharging electric power value becomes 0, and the charging and discharging command output section 54 outputs the basic charging and discharging electric power value as the command charging and discharging electric power value. As a result, the output electric power P from the storage battery 20 absorbs or mitigates variations the electric power P2 generated by the second linkage electric power generating system 102B, thereby smoothing the generated electric power P2 to result in the planned output electric power Pa.

As variations in the electric power P2 generated by the second linkage electric power generating system 102B are reduced, the battery temperature T gradually drops. When the battery temperature T becomes equal to or lower than the reference temperature Ta, the processing sequence of step S103 and subsequent steps shown in FIG. 8 are carried out.

Figure 23:
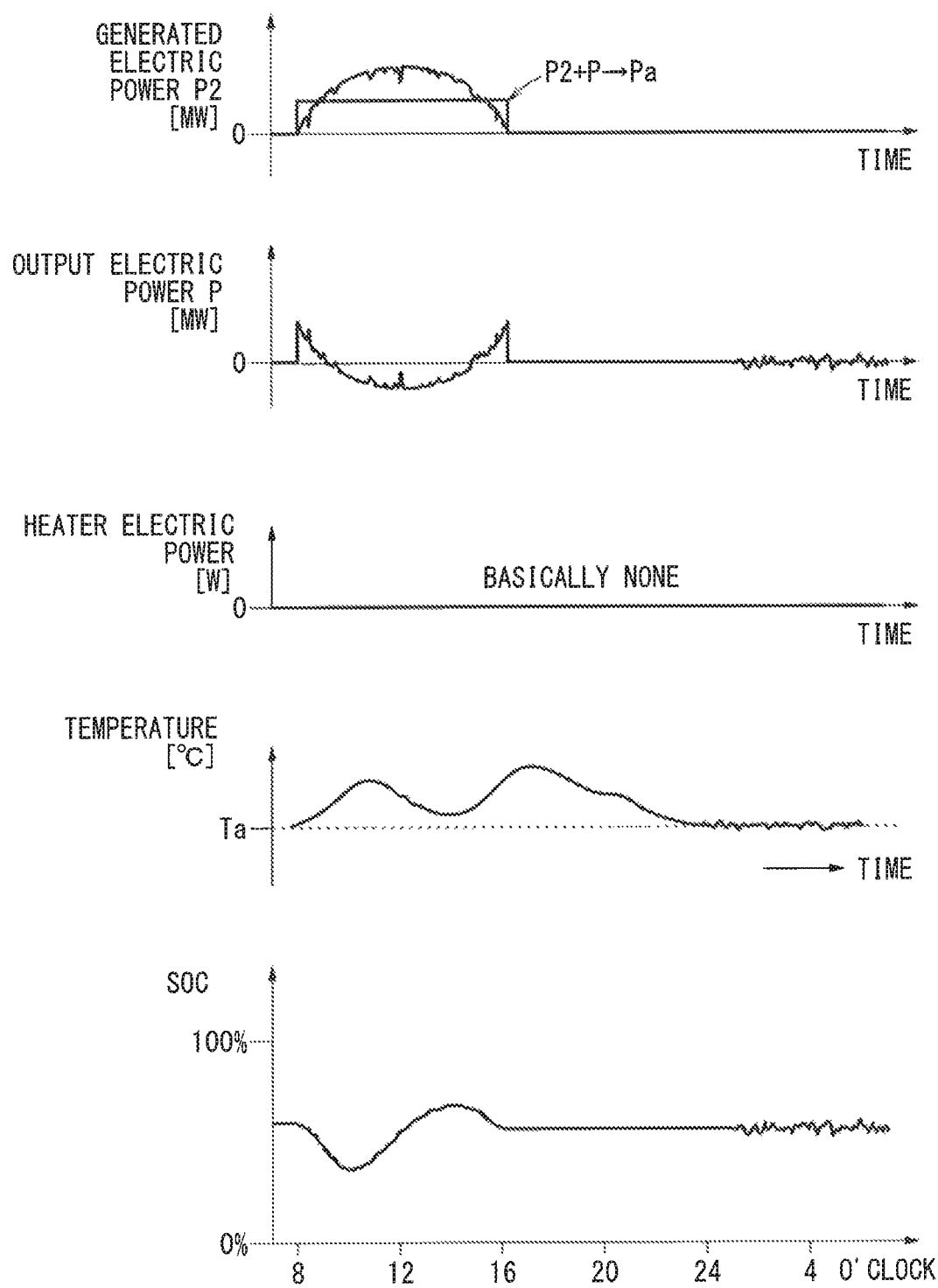
FIG. 23 is a diagram showing transitions of generated electric power of a second linkage electric power generating system, output electric power from a storage battery, heater electric power, the temperature of the storage battery, and the SOC of the storage battery in the processing sequence of the sixth higher-level controller.

As shown in FIG. 23, in the evening, after mitigation of variations in the electric power P2 generated by the second linkage electric power generating system 102B is finished, the sixth higher-level controller 44F controls the storage battery 20 in order to generate charging and discharging electric power, which is proportional to the difference Δf between the system frequency f and the reference frequency fa. Therefore, the temperature of the storage battery 20 is prevented from being lowered significantly at night, and the SOC of the storage battery 20 also is prevented from varying at night. Since the generated charging and discharging electric power is supplied to the main line 16 through the third circuit breaker 24c, the charging and discharging electric power is used as electric power to minimize variations in the system frequency f on the bus bar 14 and the main line 16, i.e., to contribute to stabilization of the system frequency f. Furthermore, inasmuch as the charging and discharging electric power generated by the storage battery 20 depends on the proportionality coefficient K, which is based on the difference ΔT between the battery temperature T and the target temperature Tb (i.e., a proportionality coefficient according to a proportional control scheme or a PID control scheme), the battery temperature T of the storage battery 20 can converge efficiently to the target temperature Tb.

Figure 24:
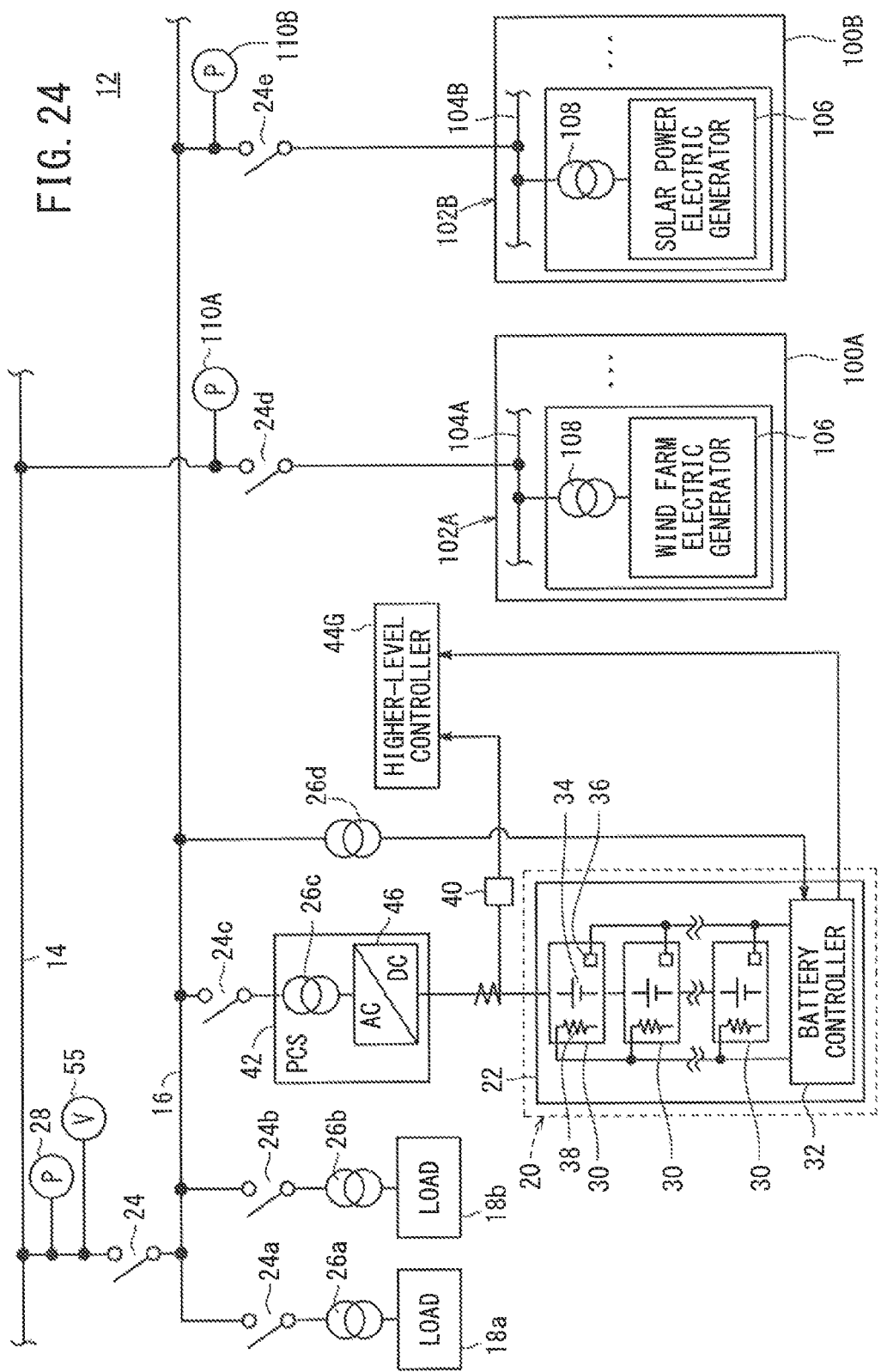
FIG. 24 is a block diagram of an electric power system incorporating a seventh higher-level controller according to an embodiment of the present invention.
Figure 26:
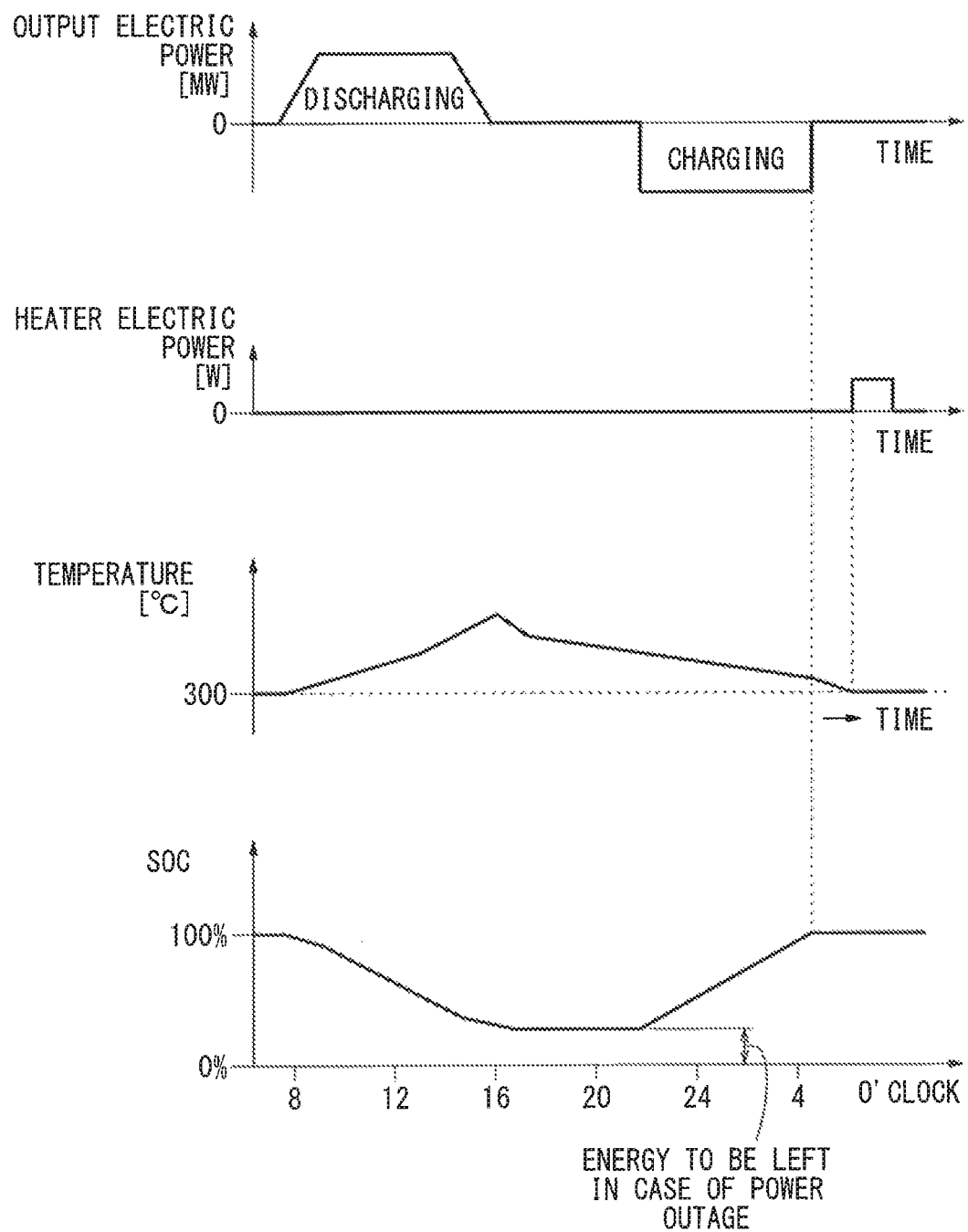
FIG. 26 is a diagram showing problems of an operating process (second process) in a wait time zone (normal zone) for a high-temperature storage battery.

As shown in FIG. 24, the electric power system 12 may include both the first linkage electric power generating system 102A as well as the second linkage electric power generating system 102B described above.

A higher-level controller according to a seventh embodiment of the present invention (hereinafter referred to as a "seventh higher-level controller 44G") is applied to the electric power system 12, which includes both the first linkage electric power generating system 102A and the second linkage electric power generating system 102B. Basic applications of the seventh embodiment include, for example, an application as an electric power source for natural energy (solar power generation) smoothing, and additional applications of the seventh embodiment include an application for natural energy (wind farm power generation) smoothing.

The seventh higher-level controller 44G, which is essentially of the same configuration as the fifth higher-level controller 44E, uses electric power for mitigating variations in the output electric power P2 of the second linkage electric power generating system 102B as basic charging and discharging electric power. The seventh higher-level controller 44G also uses electric power for mitigating variations in the output electric power P1 of the first linkage electric power generating system 102A as additional charging and discharging electric power, for thereby supplying the storage battery 20 with thermal energy in order to keep the storage battery 20 at a temperature in the vicinity of the target temperature Tb (target temperature Tb ±5° C.).

A processing sequence of the seventh higher-level controller 44G will be described below with reference to the flowcharts shown in FIG. 8 and FIG. 23.

As the second linkage electric power generating system 102B generates electric power from 8 o'clock to 16 o'clock, for example, the basic charging and discharging electric power output section 50 outputs basic charging and discharging electric power, for thereby absorbing or mitigating variations in the electric power generated by the second linkage electric power generating system 102B. At this time, as shown in FIG. 23, since the battery temperature T is higher than the reference temperature Ta, in step S105 of FIG. 8, the proportionality coefficient K to is set to 0 MW/Hz. Further, at this time, the additional charging and discharging electric power value becomes 0, and the charging and discharging command output section 54 outputs the basic charging and discharging electric power value as the command charging and discharging electric power value. As a result, the output electric power P from the storage battery 20 absorbs or mitigates variations in the electric power P2 generated by the second linkage electric power generating system 102B, thereby smoothing the generated electric power P2 to result in the planned output electric power Pa.

When the electric power P2 generated by the second linkage electric power generating system 102B becomes roughly 0, the battery temperature T gradually drops. When the battery temperature T becomes equal to or lower than the reference temperature Ta, the processing sequence of step S103 and subsequent steps shown in FIG. 8 are carried out.

As shown in FIG. 23, in the evening, after mitigation of variations in the electric power P2 generated by the second linkage electric power generating system 102B is finished, the seventh higher-level controller 44G controls the storage battery 20 to generate charging and discharging electric power based on the difference ΔP between the output electric power value P1 and the planned electric power value Pa of the first linkage electric power generating system 102A, similar to the case of the fifth higher-level controller 44E. Therefore, the temperature of the storage battery 20 is prevented from becoming lowered significantly at night, and the SOC of the storage battery 20 also is prevented from varying at night. Since the generated charging and discharging electric power is supplied to the main line 16 through the third circuit breaker 24c, the generated charging and discharging electric power is used as electric power to mitigate variations in the output electric power P1 of the first linkage electric power generating system 102A with respect to the planned electric power Pa. Furthermore, inasmuch as the charging and discharging electric power generated by the storage battery 20 depends on the proportionality coefficient K, which is based on the difference ΔT between the battery temperature T and the target temperature Tb (i.e., a proportionality coefficient determined according to a proportional control scheme or a PID control scheme), the battery temperature T of the storage battery 20 can converge efficiently to the target temperature Tb.

In the sixth and seventh embodiments, the basic applications include an application for natural energy (solar power generation) smoothing. However, such basic applications may also include an application for smoothing other natural energy sources, such as wind farm power generation.

Certain modifications of the electric power control system 10 will be described below. The first through seventh higher-level controllers 44A through 44G will also be referred to collectively as a "higher-level controller 44".

The higher-level controller 44 may be installed independently of the PCS 42, or may be incorporated in the PCS 42. Alternatively, the higher-level controller 44 may be incorporated in a management apparatus, which is of a higher level than the higher-level controller 44, or may be incorporated in the battery controller 32.

Also, partial function of the higher-level controller 44 may be incorporated in the PCS 42. Alternatively, partial function of the higher-level controller 44 may be incorporated in a management apparatus, which is of a higher level than the higher-level controller 44, or may be incorporated in the battery controller 32.

The electric power systems according to the embodiments of the present invention are effective for use as an electric power source for use in case of a power outage. However, such electric power systems may also be used to smooth the output electric power of a natural energy power generation system, to level loads, etc.

In the above embodiments, the difference Δf is processed by the high-pass filter 76 in order to extract a high-frequency component ΔfH. However, the difference Δf may be processed by a first-order lag filtering process in order to produce a low-frequency component ΔfL, which may be subtracted from the difference Δf in order to extract a high-frequency component ΔfH.

The functions of the first through seventh higher-level controllers 44A through 44G may be realized by a computer having a CPU and a memory, which execute a control program, or such functions may be realized by hardware devices.

The method of controlling a storage battery, the apparatus for controlling a storage battery, and the electric power control system according to the present invention are not limited to the above embodiments, but various changes and modifications may be made to the embodiments without departing from the scope of the invention as set forth in the appended claims.

The invention claimed is:

1. A method of controlling a high-temperature storage battery connected to an electric power system after supplying electric power from an electric power supply to a heater to provide thermal energy to the storage battery during activation of the storage battery, the method comprising the steps of:

measuring a temperature of the storage battery;

determining whether the measured temperature of the storage battery is equal to or lower than a predetermined reference temperature; and charging and discharging the storage battery with charging and discharging electric power based on a predetermined operating process for the storage battery; and controlling the charging and discharging when the temperature of the storage battery is equal to or lower than the predetermined reference temperature, wherein:

in the step of controlling the charging and discharging, the storage battery is charged and discharged with charging and discharging electric power, which is a sum of the charging and discharging electric power based on the predetermined operating process for the storage battery and charging and discharging electric power corresponding to charging and discharging cycles in which each of a continuous charging time is 1 hour or shorter and each of a continuous discharging time is 1 hour or shorter, for thereby generating thermal energy in the storage battery to increase the temperature of the storage battery to be at least equal to the reference temperature without supplying electric power to the heater.

2. The method according to claim 1, wherein controlling charging and discharging of electric power from the storage battery in the charging and discharging cycles further comprises;

determining a differential signal based on a difference between the frequency of the electric power system and a reference frequency, and charging and discharging electric power from the storage battery based on the determined differential signal in the predetermined operating process for the storage battery.

3. The method according to claim 2, wherein controlling charging and discharging of electric power from the storage battery in the charging and discharging cycles further comprises;

determining a high-frequency component of the differential signal; and charging and discharging electric power from the storage battery based on the determined high-frequency component of the differential signal in the predetermined operating process for the storage battery.

4. The method according to claim 3, wherein the high-frequency component is extracted by a high-pass filter having a cut-off frequency of 1/3600 Hz or lower.

5. The method according to claim 1, wherein controlling charging and discharging of electric power from the storage battery in the charging and discharging cycles further comprises:

determining a differential signal based on a difference between electric power generated by the electric power system and electric power demands for the electric power system; and charging and discharging electric power from the storage battery based on the determined differential signal in the predetermined operating process for the storage battery.

6. The method according to claim 5, wherein controlling charging and discharging of electric power from the storage battery in the charging and discharging cycles further comprises:

determining a high-frequency component of the differential signal; and charging and discharging electric power from the storage battery based on the determined high-frequency component of the differential signal in the predetermined operating process for the storage battery.

7. The method according to claim 6, wherein the high-frequency component is extracted by a high-pass filter having a cut-off frequency of 1/3600 Hz or lower.

8. The method according to claim 1, wherein controlling charging and discharging of electric power from the storage battery in the charging and discharging cycles further comprises:

determining a differential signal based on a difference between determining a differential signal based on a difference between electric power generated by a natural-energy-based electric generating apparatus connected to the electric power system and planned output electric power; and charging and discharging electric power from the storage battery based on the determined differential signal in the predetermined operating process for the storage battery.

9. The method according to claim 8, wherein controlling charging and discharging of electric power from the storage battery in the charging and discharging cycles further comprises:

determining a high-frequency component of the differential signal; and charging and discharging electric power from the storage battery based on the determined high-frequency component of the differential signal in the predetermined operating process for the storage battery.

10. The method according to claim 9, wherein the high-frequency component is extracted by a high-pass filter having a cut-off frequency of 1/3600 Hz or lower.

11. The method according to claim 1, further comprising adjusting an amount of thermal energy supplied to the storage battery by one of increasing and reducing an average amplitude of the charging and discharging electric power.

12. The method according to claim 1, further comprising adjusting an amount of thermal energy supplied to the storage battery in the charging and discharging cycles by one of increasing and reducing a ratio of a time during which the charging and discharging cycles are performed to a time during which the charging and discharging cycles are not performed within a time zone in which the storage battery is in a standby state.

13. The method according to claim 1, further comprising:

establishing a target temperature Tb that is to be achieved by controlling charging and discharging of the storage battery with the sum of the charging and discharging electric power in the predetermined operating process for the storage battery; and establishing a target temperature Tc that is to be achieved by controlling a supply of electric power to a heater, wherein the target temperature Tb and the target temperature Tc satisfy the relationship Tb>Tc.

14. The method according to claim 1, further comprising:

establishing a predetermined temperature that is an upper-limit temperature at which the storage battery is allowed to be charged and discharged; and stopping the charging and discharging of the storage battery with the sum of the charging and discharging electric power in the predetermined operating process for the storage battery when the temperature of the storage battery becomes equal to or higher than the predetermined temperature.

* * * * *